US006388362B1

(12) United States Patent
Suzuki et al.

(10) Patent No.: US 6,388,362 B1
(45) Date of Patent: May 14, 2002

(54) ULTRASONIC MOTOR AND ELECTRONIC APPARATUS HAVING ULTRASONIC MOTOR

(75) Inventors: Kenji Suzuki; Takashi Yamanaka; Akihiro Iino; Kazuo Katou; Makoto Suzuki, all of Chiba (JP)

(73) Assignee: Seiko Instruments Inc. (JP)

(*) Notice: Subject to any disclaimer, the term of this patent is extended or adjusted under 35 U.S.C. 154(b) by 0 days.

(21) Appl. No.: 09/245,046

(22) Filed: Feb. 4, 1999

(30) Foreign Application Priority Data

| Feb. 5, 1998 | (JP) | ............................................. 10-024800 |
| Feb. 13, 1998 | (JP) | ............................................. 10-031510 |
| Feb. 13, 1998 | (JP) | ............................................. 10-031512 |
| Jan. 7, 1999 | (JP) | ............................................. 11-002287 |

(51) Int. Cl.[7] ............................................. H01L 41/08
(52) U.S. Cl. ............................................. 310/316.02
(58) Field of Search ........................ 310/316.01, 316.02

(56) References Cited

U.S. PATENT DOCUMENTS

| 5,365,139 A | * | 11/1994 | Kasuga et al. | ......... 310/316.02 |
| 5,416,374 A | * | 5/1995 | Inoue et al. | ......... 310/316.02 X |
| 5,592,041 A | * | 1/1997 | Kasuga et al. | ......... 310/316.02 |
| 5,619,089 A | * | 4/1997 | Suzuki et al. | ......... 310/316.02 X |
| 5,770,912 A | * | 6/1998 | Suzuki et al. | ......... 310/316.02 |
| 5,780,955 A | * | 7/1998 | Iino et al. | ......... 310/316.02 |

* cited by examiner

Primary Examiner—Mark O. Budd
(74) Attorney, Agent, or Firm—Adams & Wilks

(57) ABSTRACT

An ultrasonic motor includes an oscillation drive circuit for generating an oscillation wave by self-excited oscillation of an oscillator bonded with a piezoelectric element, and a start/stop signal generating circuit for generating a signal for controlling the starting and stopping of the ultrasonic motor by bringing the oscillation drive circuit into an active state and a stop state, respectively. The oscillation drive circuit includes a power amplifier for amplifying an excitation signal, a capacitive circuit for adjusting a frequency of the excitation signal, and a switching circuit connected to a capacitive element of the capacitive circuit for short-circuiting terminals of the capacitive element based on an output signal of the start/stop signal generating circuit.

38 Claims, 23 Drawing Sheets

ULTRASONIC MOTOR AND ELECTRONIC APPARATUS HAVING ULTRASONIC MOTOR

BACKGROUND OF THE INVENTION

The present invention relates to an improvement in an ultrasonic motor having an oscillation drive circuit for forming an excitation signal based on excitation of a piezoelectric element and an electronic apparatus having an ultrasonic motor.

In recent times, ultrasonic motors producing driving force by making use of the piezoelectric effect of a piezoelectric element have attracted attention in the field of micromotors. The ultrasonic motor is a motor making use of a mechanical resonance phenomenon, a drive frequency thereof is varied by environmental temperature or outside load and accordingly, there is needed a complicated drive circuit such that a frequency tracking function is added to an outside oscillator or the like. However, an oscillator bonded with a piezoelectric element can simply be driven by making use of oscillation drive system for driving the oscillator by self-excited oscillation.

As an example of an oscillation drive circuit making use of such self-excited oscillation, as shown by FIG. 23, there has been known a type having a piezoelectric element 102 to be excited, a 3-state inverter 502 as well as 3-state buffers 501a and 501b for amplifying an initial signal based on the excitation to an excitation signal and condensers 505 and 506 for setting the excitation signal to a predetermined frequency (refer to JP-A-8-251952).

Further, a flection standing wave is caused in an oscillator 101 bonded to the piezoelectric element 102 and frictional force is exerted to a moving body (not illustrated) pressed to the oscillator 101 to thereby rotate the moving body in a predetermined direction.

However, according to an oscillation drive circuit 405 making use of self-excited oscillation as mentioned above, when the circuit is restarted after the oscillation drive has been stopped, there poses a problem of remaining electric charge of the condensers 505 and 506 or a problem in which even when the 3-state inverter 502 as well as the 3-state buffers 501a and 501b are brought into an active state, both of a Pch transistor and an Nch transistor are brought into an OFF state, that is, an output is brought into a high impedance state which is caused by a dispersion in the semiconductor process, and there poses a problem in which an initial signal constituting a basis of self-excited oscillation becomes difficult to produce in the oscillation drive circuit 405, much time is required to rise of oscillation, further, failure of starting oscillation is resulted and so on to thereby deteriorate reliability or high response which is a feature of an ultrasonic motor.

SUMMARY OF THE INVENTION

It is an object of the present invention to provide an ultrasonic motor and an electronic apparatus having an ultrasonic motor which is excellent in response or stability in restarting operation and highly reliable.

In order to resolve the above-described problem, according to claim 1, the oscillation drive circuit comprises a power amplifier for amplifying an excitation signal, a capacitive circuit for adjusting a frequency of the oscillation signal, and a switching circuit connected in parallel with a capacitive element constituting the capacitive circuit for shortcircuiting terminals of the capacitive element based on an output signal from the start/stop signal generating means, wherein when the oscillation drive circuit is brought into the stop state based on the output signal from the start/stop signal generating means, the switching circuit is made ON and the terminals of the capacitive element is brought into a shortcircuited state.

According to the invention, electric charge remaining in the capacitive element is discharged in the stop state and in restarting operation, there is provided excellent oscillation rise characteristic by facilitating to form an initial signal constituting the basis of oscillation and the ultrasonic motor and an electronic apparatus having the ultrasonic motor excellent in response and which is highly reliable are realized.

According to the invention described in claim 2, the oscillation drive circuit comprises a power amplifier for amplifying an excitation signal, a capacitive circuit for adjusting a frequency of the excitation signal, and an oscillation starting circuit for generating an oscillation start trigger based on the output signal from the start/stop signal generating means, and wherein the oscillation starting circuit is operated during a rise time period in which the oscillation drive circuit is brought into an active state and starts oscillation based on the output signal from the start/stop signal generating means.

According to the invention, in respect of a high impedance state of an output from the power amplifier which is caused in rise of oscillation which is brought about by a dispersion in semiconductor process regardless of the fact that the power amplifier is brought into an active state, failure in starting to oscillate is avoided by generating the oscillation start trigger during the rise time period of starting the oscillation and there can be realized the ultrasonic motor and an electronic apparatus having the ultrasonic motor with high response and high reliability providing excellent oscillation rise characteristic.

According to the invention described in claim 3, the oscillation drive circuit comprises a power amplifier for amplifying an excitation signal, a capacitive circuit for adjusting a frequency of the excitation signal, a switching circuit connected in parallel with a capacitive element constituting the capacitive circuit for shortcircuiting terminals of the capacitive element based on an output signal from the start/stop signal generating means, and an oscillation starting circuit for generating an oscillation start trigger based on the output signal from the start/stop signal generating means, wherein when the oscillation drive circuit is brought into the stop state based on the output signal from the start/stop signal generating means, the switching circuit is made ON and the terminals of the capacitive element are brought into a shortcircuited state, and wherein when the oscillation drive circuit is brought into an active state based on the output signal from the start/stop signal generating means, the switching circuit is made OFF and the oscillation starting circuit for generating the oscillation start trigger is operated during a rise time period of starting oscillation.

According to the invention, electric charge remaining in the capacitive element is discharged in the stop state and an initial signal constituting a basis of oscillation is facilitated to form in restarting operation and in respect of a high impedance state of an output from the power amplifier caused in rise of oscillation which is brought about by a dispersion in semiconductor process, failure of starting oscillation is avoided by generating the oscillation start trigger during a rise time period of starting oscillation by which there is realized the ultrasonic motor with excellent response and high reliability providing further excellent oscillation rise characteristic and an electronic apparatus having the ultrasonic motor.

According to the invention described in claim 4, the oscillation drive circuit comprises a capacitive circuit for adjusting a frequency of the oscillation signal and the power amplifier constituted by using an inverter at an input unit.

According to the invention, there is realized the ultrasonic motor with excellent response and high reliability avoiding failure of starting oscillation caused by dispersion in semiconductor process and providing excellent oscillation rise characteristic.

According to the invention described in claim 5, the oscillation drive circuit comprises a capacitive circuit for adjusting a frequency of the excitation signal, a switching circuit connected in parallel with a capacitive element constituting the capacitive circuit for shortcircuiting terminals of the capacitive element based on an output signal from the start/stop signal generating means and a power amplifier for amplifying an excitation signal and constituted by using an inverter at an input unit, wherein when the oscillation drive circuit is brought into a stop state based on the output signal from the start/stop signal generating means, the switching circuit is made ON and the terminals of the capacitive element is shortcircuited.

According to the invention, electric charge remaining in the capacitive element is discharged in the stop state, an initial signal constituting a basis of oscillation is facilitated to form in restarting operation and failure of starting oscillation caused by a dispersion in semiconductor process is avoided by which there is realized the ultrasonic motor with excellent response and high reliability providing further excellent oscillation rise characteristic and an electronic apparatus having the ultrasonic motor.

According to the invention described in claim 6, there is provided the ultrasonic motor according to claim 4 or claim 5 wherein the power amplifier of the oscillation drive circuit comprises the inverter installed at the input unit, and a prebuffer installed between the inverter and an output unit, wherein inversion voltages of the inverter of the input unit and the prebuffer is a half of a power source voltage.

According to the invention, the operating point of oscillation is at a half of the power source voltage and accordingly, further excellent oscillation rise characteristic is achieved.

According to the invention described in claim 7, there is provided the ultrasonic motor according to any one of claim 1 through claim 6 wherein two sets of electrode groups comprising a plurality of electrodes are formed on a surface of the piezoelectric element, wherein the oscillation drive circuit includes two power amplifiers output terminals of which are connected respectively to the two sets of electrode groups formed on the surface of the piezoelectric element for driving to oscillate the respective electrode groups independently from each other, and wherein a rotational direction of the moving body is switched by selecting which power amplifier of the two power amplifiers the output terminals of which are connected to the respective two sets of electrode groups formed on the surface of the piezoelectric element is to be brought into an active state based on the output signal from the start/stop signal generating means.

According to the invention, there is provided the ultrasonic motor for switching the rotational direction by selecting to use the two electrode groups of the piezoelectric element and the motor is driven by oscillation by selectively bringing the power amplifier into an active state and therefore, there is provided the ultrasonic motor of a self-excited drive style facilitating oscillation and having excellent oscillation rise characteristic.

According to the invention described in claim 8, there is provided the ultrasonic motor according to claim 7 wherein the two power amplifiers the output terminals of which are connected to the two sets of electrode groups formed on the surface of the piezoelectric element are respectively constituted by a plurality of power amplifying circuits connected in parallel with each other, further comprising output adjusting signal generating means for outputting a signal for adjusting an output impedance of the power amplifier by selecting the power amplifying circuit to be functioned among the plurality of power amplifying circuits.

According to the invention, there is provided the ultrasonic motor switching the rotational direction by selecting to use the two electrode groups of the piezoelectric element and the motor is driven by oscillation by selectively bringing the power amplifier into an active state and accordingly, the output impedance of the power amplifier, that is, the motor output can be adjusted similar to the method of switching start/stop or rotational direction by respectively constituting the plurality of power amplifying circuits where the power amplifiers are connected in parallel with each other. Accordingly, there can be realized the ultrasonic motor of a self-excited oscillation drive style with high function and high reliability capable of optimally driving the motor against a change in load or outer environment.

According to the invention described in claim 9, there is provided the ultrasonic motor according to claim 8, further comprising voltage detecting means for detecting a power source voltage of a power source, and voltage comparing means for comparing the voltage detected by the voltage detecting means with a predetermined power source voltage data.

According to the invention, as a result of comparison by the voltage comparing means, when the voltage detected by the voltage detecting means and the power source voltage data do not coincide with each other, the output impedance of the power amplifier can be adjusted by power adjusting signal generating means and there can be realized the ultrasonic motor of a self-excited drive system with high reliability capable of dealing with the change in the power source voltage or the like.

According to the invention described in claim 10, there is provided the ultrasonic motor according to any one of claim 1 through claim 9 wherein the output impedance of the power amplifier is adjusted by cutting connection of drain sides of output stage transistors of the power amplifier constituting the oscillation drive circuit based on the output signal from the start/stop signal generating means or the output adjusting signal generating means.

According to the invention, switching of start/stop and rotational direction, adjustment of the output impedance of the power amplifier for adjusting the output of the motor can be realized by a very simple circuit constitution and there can be inexpensively realized the ultrasonic motor of a self-excited oscillation drive type with high response and reliability.

According to the invention described in claim 11, there is provided an ultrasonic motor comprising an oscillation drive circuit for generating an oscillation wave by self-excited oscillation by the oscillator bonded with the piezoelectric element, and start/stop signal generating means for generating a signal for controlling start/stop of the ultrasonic motor by bringing the oscillation drive circuit into an active state/stop state, wherein two sets of electrode groups comprising a plurality of electrodes are formed on a surface of the piezoelectric element and the oscillation drive circuit comprises two power amplifiers output terminals of which are connected to respectively the two sets of electrode groups formed on the surface of the piezoelectric element for driving to excite the respective electrode groups independently from each other and a capacitive circuit for adjusting a frequency of an excitation signal wherein a rotational direction of the moving body is switched by selecting which power amplifier of the two power amplifiers the output terminals of which are connected to respectively the two sets of electrode groups formed on the surface of the piezoelectric element is to be brought into an active state, the ultrasonic motor further comprising self-excited oscillation rise controlling means for forming an initial signal in the oscillation drive circuit by bringing both of the two power amplifiers into the active state when the ultrasonic motor is started and bringing either one of the power amplifiers into a stop state and starting driving operation in accordance with the output signal from the start/stop signal generating means after the initial signal has been amplified to the excitation signal by the oscillation drive circuit.

According to the invention, although in driving the motor, only one of the two sets of the electrode groups is used, in rise of oscillation, both of the electrode groups are used and accordingly, the loop gain of the oscillation drive circuit becomes high and the oscillation rise time period is considerably shortened and there is realized the ultrasonic motor in which the reliability in rise of oscillation is promoted and the response is excellent and an electronic apparatus having the ultrasonic motor.

According to the invention described in claim 12, there is provided the ultrasonic motor according to any one of claim 1 through claim 11 wherein the oscillation drive circuit includes a resonating circuit constituted by the oscillator and the capacitive element by utilizing an inductive property provided to the oscillator bonded with the piezoelectric element in a mechanical resonance state.

According to the invention, the mechanical resonance of the oscillator is sharp and accordingly, there can be constituted the oscillation drive circuit which is excellent in the performance of selecting frequency and is provided with excellent stability.

According to the invention described in claim 13, there is provided the ultrasonic motor according to any one of claim 1 through claim 12 wherein the piezoelectric element is formed with electrodes of a multiple of 4 substantially at equal intervals on the at least one surface and subjected to a polarization treatment in which contiguous two electrodes are paired and a direction of the polarization treatment is reversed at each pair, further comprising first connecting means and second connecting means for constituting the two sets of electrode groups by electrically shortcircuiting every other electrode, and projections for transmitting a power to the moving body at positions of vicinities of every other boundary of the electrodes formed by the multiple of 4 substantially at equal intervals on the at least one plane of the piezoelectric element on one surface of the oscillator.

According to the invention, there is provided the ultrasonic motor of a single phase drive capable of switching the rotational direction by selecting the two sets of the electrode groups and there is achieved an effect of significantly simplifying the constitution of the oscillation drive circuit owing to the single phase drive.

According to the invention of claim 14, there is provided the ultrasonic motor according to any one of claim 1 through claim 13, further comprising rotational information detecting means for detecting a rotational state of the moving body, and an electrostatic capacity adjusting circuit as rotational number controlling means for adjusting a rotational number of the moving body based on an output signal from the rotational information detecting means.

According to the invention, there can be realized the ultrasonic motor having high stability against drive environment, load variation or the like only by adjusting the electrostatic capacitance by the capacitive circuit of the oscillation drive circuit.

According to the invention of claim 15, there is provided an electronic apparatus having an ultrasonic motor comprising the ultrasonic motor described in any one of claim 1 through claim 14.

According to the invention, there can be constituted the electronic apparatus with higher function and higher reliability by the feature provided to the ultrasonic motor.

DETAILED DESCRIPTION OF THE PREFERRED EMBODIMENTS

A detailed explanation will be given of embodiments to which the invention is applied in reference to FIG. 1 through FIG. 22 as follows.

First Embodiment

An ultrasonic motor is constituted by an ultrasonic motor main body as a mechanical constitution, a drive unit for driving the ultrasonic motor main body and a control unit for controlling the drive unit and the ultrasonic motor main body. An explanation will be given thereof as follows.

Figure 1:
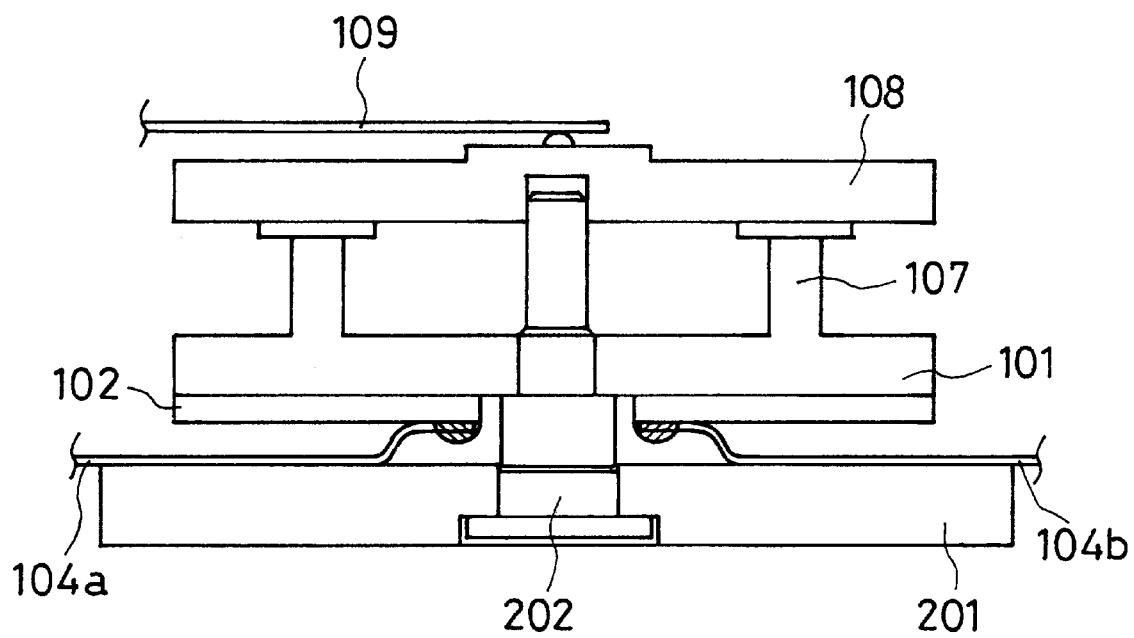
FIG. 1 is a structural view according to a first embodiment of an ultrasonic motor to which the invention is applied.

FIG. 1 is a view showing the structure of an ultrasonic motor to which the invention is applied.

First, in FIG. 1, an ultrasonic motor main body is installed with a piezoelectric element 102, an oscillator 101 bonded to the piezoelectric element 102, a moving body 108 which is brought into contact with projections 107 installed to the oscillator 101, pressing means 109 for pressing the moving body 108 and the oscillator 101, a support shaft 202 fixed to a hole installed at the center of the oscillator 101 and a fixing base 201 fixed with a base end of the support shaft 202. Further, first connecting means 104a and second connecting means 104b are arranged on the fixing base 201.

Figure 2A:
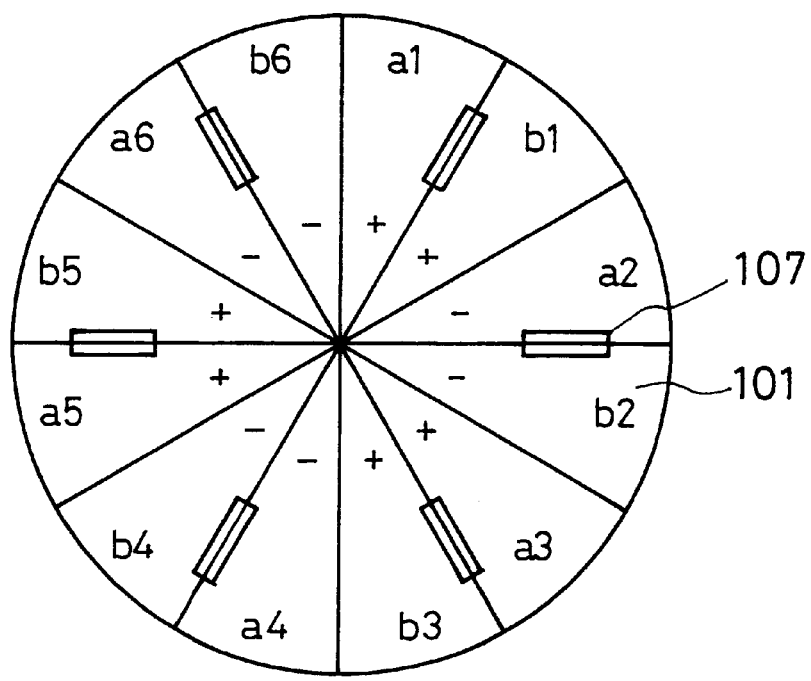
FIGS. 2A and 2B are views showing a plane structure and a sectional structure of an oscillator according to the first embodiment of the ultrasonic motor to which the invention is applied.
Figure 2B:
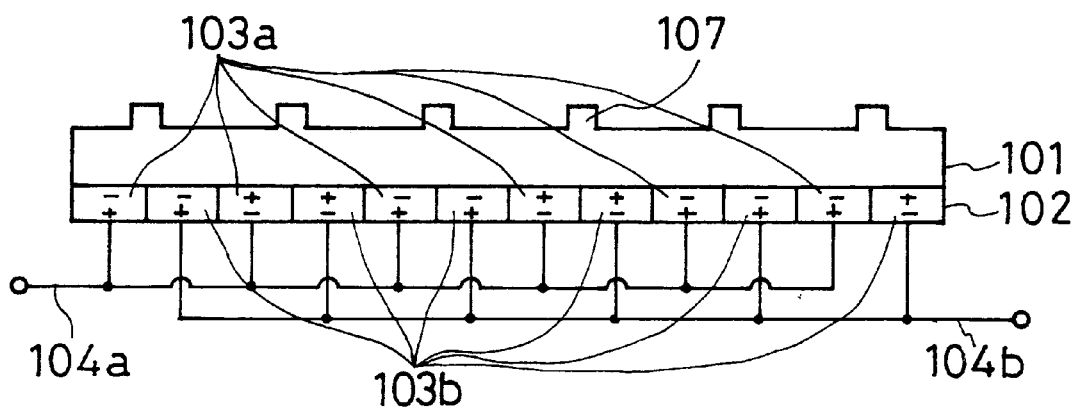
Figure 3A:
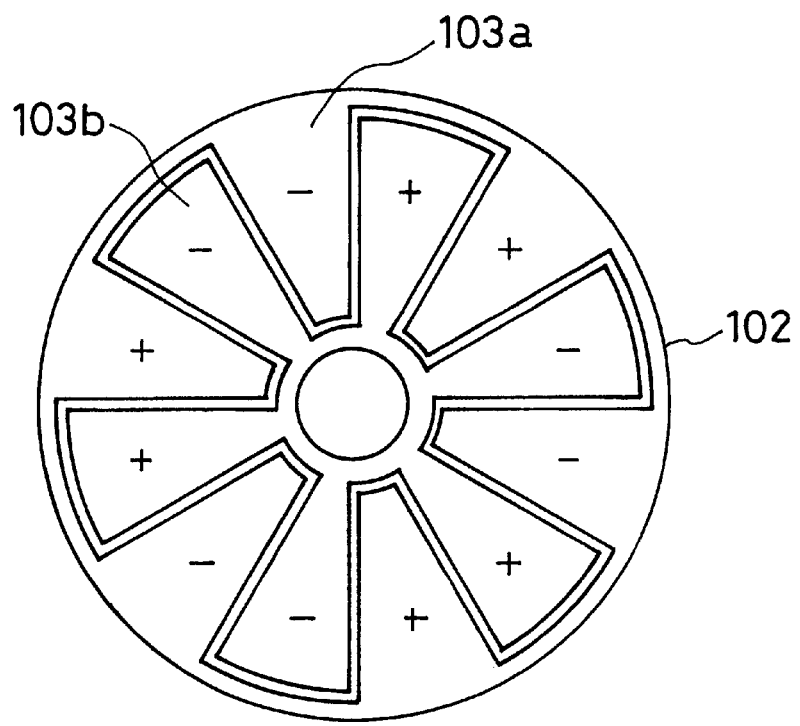
FIGS. 3A and 3B are views showing a plane structure of a piezoelectric element according to the first embodiment of the ultrasonic motor to which the invention is applied.
Figure 3B:
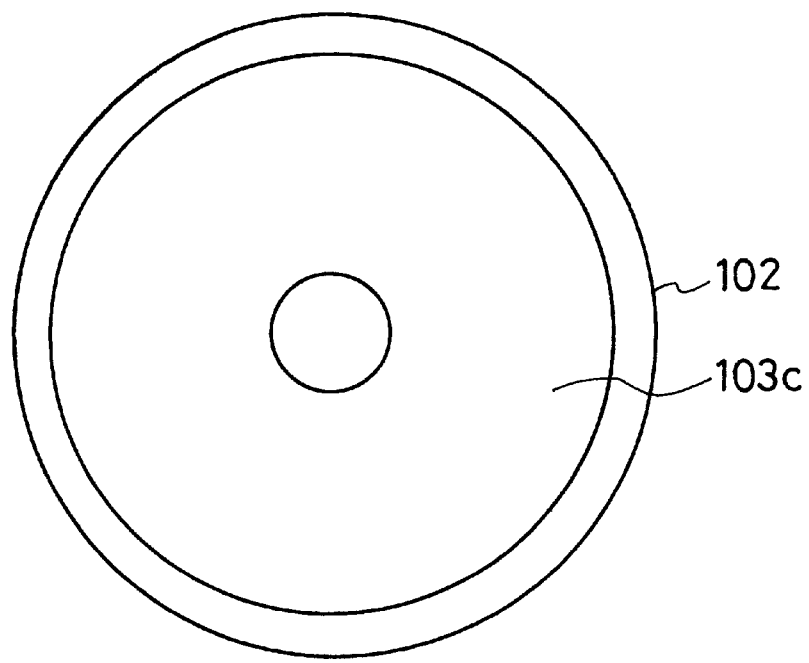

FIGS. 2A and 2B illustrate drawings showing a plane structure and a sectional structure of the oscillator 101 applied to the ultrasonic motor and FIGS. 3A and 3B illustrate a plane structure of the piezoelectric element 102.

As shown by FIG. 2A, in order to produce standing waves of 3 wavelengths in the peripheral direction of the oscillator 101 having a shape of a circular disk, fan-like electrodes (a1, b1, ..., a6, b6) each in correspondence with ¼ wavelength component and divided in 12 substantially uniformly, are formed on one plane of the piezoelectric element 102.

In respect of polarization treatment, a polarization treatment in the thickness direction is conducted such that directions thereof are alternately reverted at each set of contiguous two electrodes. In this case, (+) or (−) in the drawing designates the direction of the polarization treatment, in the case of (+) positive electric field is applied to a face thereof bonded with the oscillator 101 and in the case of (−) negative electric field is applied to the face bonded with the oscillator 101.

Further, as shown by FIG. 3A, after conducting the polarization treatment, 2 sets of electrode patterns 103a and 103b which are shortcircuited to every other electrode are formed by using shortcircuit electrodes. These electrodes are formed by thin film forming means of vapor deposition, sputtering, printing or the like. Further, as shown by FIG. 2B, the two electrode patterns 103a and 103b are respectively connected to the connecting means 104a and 104b.

As shown by FIGS. 2A and 2B, the oscillator 101 is in a shape of a circular plate made of metal and the projections 107 in a square shape for converting oscillation energy of the oscillator 101 into drive force of the moving body 108 are installed at every other boundary of divided portions of the piezoelectric element 102 (position intermediary between a node and a loop of a standing wave).

FIG. 4 illustrates drawings showing the principle of operating the ultrasonic motor.

Figure 4A:
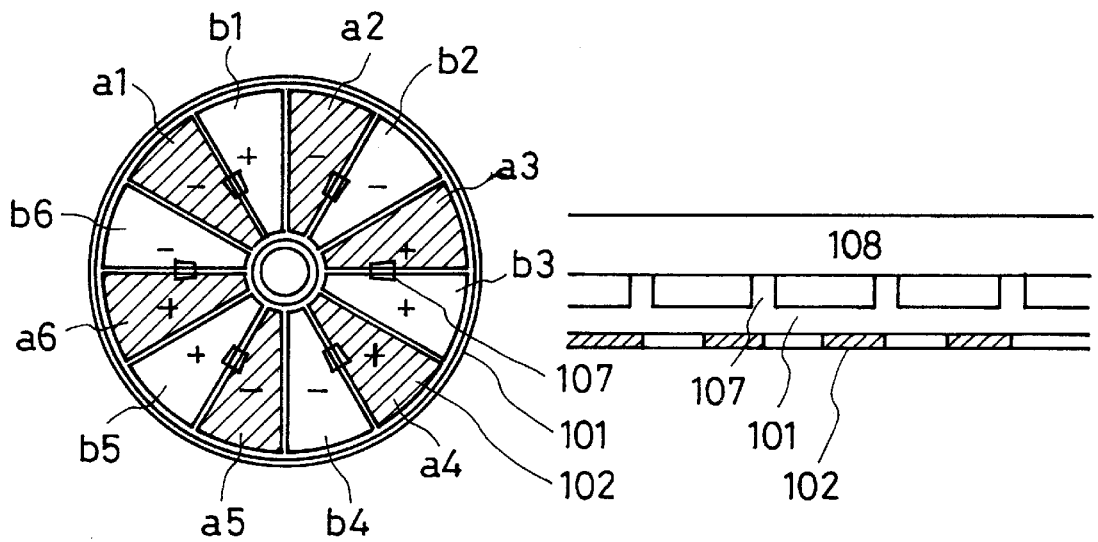
FIGS. 4A, 4B and 4C are views showing the principle of operation according to the first embodiment of the ultrasonic motor to which the invention is applied.
Figure 4B:
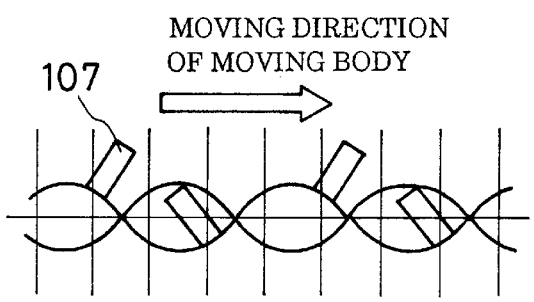

In FIG. 4A, when an excitation signal is inputted to one of the electrode patterns (103a or 103b) of the piezoelectric element 102, the divided portions are excited at a predetermined frequency and a flection standing wave of the 3 wavelengths is caused in the oscillator 101. At this occasion, as shown by FIG. 4B, the projections 107 installed at the oscillator 101 conduct an upward and downward motion while drawing arcs since they are disposed at intermediaries between the loops and the nodes of the flection standing wave. The projections 107 are brought into contact with the moving body 108 when they move from left to right direction in the drawing and accordingly, the moving body 108 is moved in an arrow mark direction of the drawing.

Figure 4C:
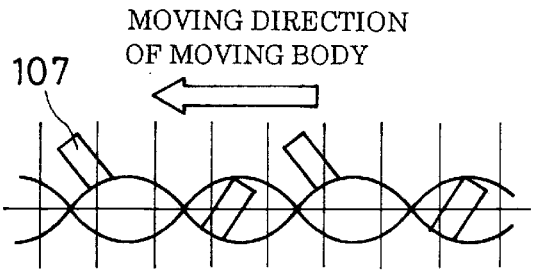

Meanwhile, in FIG. 4A, when an excitation signal is inputted to other electrode pattern, there causes a flection standing wave having a positional phase different from that of the flection standing wave mentioned above by a ¼ wavelength component in the oscillator 101. At this occasion, as shown by FIG. 4C, the projections 107 are brought into contact with the moving body 108 only when they move from right to left direction of the drawing and accordingly, the moving body 108 is moved in a direction reverse to the above-described.

Figure 5:
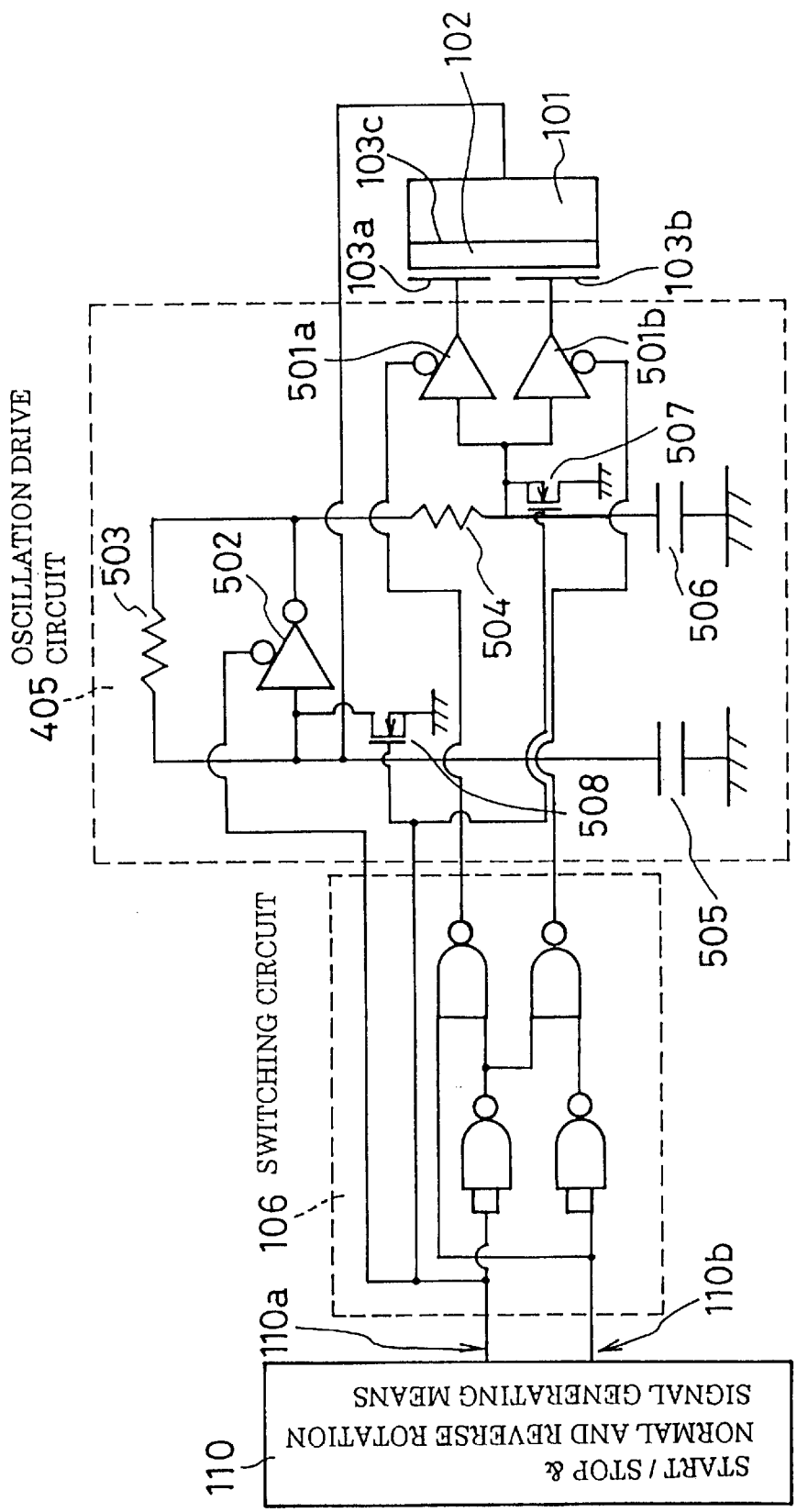
FIG. 5 is a view showing an oscillation drive circuit according to the first embodiment of the ultrasonic motor to which the invention is applied.

FIG. 5 is a drawing showing an oscillation drive circuit applied to the ultrasonic motor of the embodiment.

The drive unit of the ultrasonic motor comprises the oscillation drive circuit 405 connected to the piezoelectric element 102 or the like and the control unit is constituted by a switching circuit 106 connected to the oscillation drive circuit 405 and Start/stop and normal and reverse rotation signal generating means 110 connected to the switching circuit 106.

The oscillation drive circuit 405 is constituted by the 3-state buffers 501a and 501b output terminals of which are connected to the electrode patterns 103a and 103b of the piezoelectric element 102 and control terminals of which are connected to the switching circuit 106, the condenser 505 one end of which is connected to the oscillator 101 also serving as an electrode and other end of which is grounded, a pull-down switch 508 one end of which is connected to the oscillator 101 and the condenser 505, other end of which is grounded and a control terminal of which is connected to the switching circuit 106, the 3-state inverter 502 a control terminal of which is connected to the switching circuit 106, a resistor 503 connected to the 3-state inverter 502 in parallel therewith, a resistor 504 one end of which is connected in series to an output terminal of the 3-state inverter 502, the condenser 506 as a capacitive circuit one end of which is connected to other end of the resistor 504 and other end of which is grounded and a pull-down switch 507 as a switching circuit one end of which is connected to one end of the condenser 506 and input terminals of the 3-state buffers 501a and 501b, other end of which is grounded and a control terminal of which is connected to the switching circuit 106.

In this case, when the 3-state buffers 501a and 501b are inputted with Low signals after having been reverted at their control terminals, they amplify signals inputted from the input terminals and output the signals to the electrode patterns 103a and 103b of the piezoelectric element 102.

When the 3-state inverter 502 is inputted with a Low signal after having been reverted at its control terminal, it reverts to amplify a signal inputted from the oscillator 101 to its input terminal and charge or discharge the condenser 506 via the resistor 504. The 3-state buffers 501a and 501b input the signal and output non-reverted amplified signals.

The condensers 505 and 506 set the excitation signal formed in the oscillation drive circuit 405 to a predetermined frequency.

When the pull-down switches 507 and 508 as switching circuits, are inputted with High signals at their control terminals in the case of stopping the oscillation drive circuit 405, they discharge electric charge remaining in the condensers 505 and 506 and bring the condensers 505 and 506 into a null electric charge state and set the input terminals of the 3-state inverter 502 and the 3-state buffers 501a and 501b to Low level. In this way, when no electric charge is stored in the condensers 507 and 508, large current flows in the oscillation drive circuit 405 at the starting moment and an initial signal constituting a basis of self-excited oscillation is easy to generate.

Further, when pull-up switches are used in the switching circuits, in the case of stopping the oscillation drive circuit 405, electric charge is charged to the condensers 505 and 506 to be brought into a saturated state and the input terminals of the 3-state inverter 502 and the 3-state buffers 501a and 501b are set to High level. Further, in starting operation, a portion of the charged electric charge is discharged by which large current flows in the oscillation drive circuit 405 and the initial signal is easy to generate.

The Start/stop and normal and reverse rotation signal generating means 110 is provided with a first output terminal 110a for determining active state/stop state of the oscillation drive circuit 405 and a second output terminal 110b for determining forward/rearward rotation of the moving body 108 and High signal or Low signal is outputted from the two output terminals 110a and 110b.

When High signal is outputted from the first output terminal 110a of the Start/stop and normal and reverse rotation signal generating means 110, the switching circuit 106 inputs reverted Low signal to the control terminal of the 3-state inverter 502 and inputs High signal to the control terminals of the pull-down switches 507 and 508. Further, the 3-state inverter 502 becomes DISABLE and the pull-down switches 507 and 508 are made ON.

Meanwhile, when Low signal is outputted from the first output terminal 110a, reverted High signal is inputted to the control terminal of the 3-state inverter 502 and Low signal is inputted to the control terminals of the pull-down switches 507 and 508. Further, the 3-state inverter 502 becomes ENABLE and the pull-down switches 507 and 508 are made OFF.

At this occasion, when High signal is outputted from the second output terminal 110b of the Start/stop and normal and reverse rotation signal generating means 110, the 3-state buffer 501a becomes ENABLE and the 3-state buffer 501b becomes DISABLE. Meanwhile, when Low signal is outputted from the second output terminal 110b, the 3-state buffer 501a becomes DISABLE and the 3-state buffer 501b becomes ENABLE. Further, rotation in the forward and rearward direction of the moving body 108 is determined.

Next, an explanation will be given of the operation of an ultrasonic motor according to the embodiment in reference to FIG. 5.

High signal is outputted from the first output terminal 110a of the Start/stop and normal and reverse rotation signal generating means 110.

At this movement, the High signal is inverted and inputted to the control terminal of the 3-state inverter 502 to thereby make the 3-state inverter 502 DISABLE and bring the oscillation drive circuit 405 into a stop state. Further, the High signal is inputted to the control terminals of the pull-down switches 507 and 508 and the High signal brings the pull-down switches 507 and 508 into an ON state. At this occasion, electric charge remaining in the condensers 505 and 506 is discharged, the electric charge stored in the condensers 505 and 506 is nullified and the input terminals of the 3-state inverter 502 and the 3-state buffers 501a and 501b are set to Low level.

Next, Low signal is outputted from the first output terminal 110a of the Start/stop and normal and reverse rotation signal generating means 110 and High signal is outputted from the second output terminal 110b.

At this moment, the Low signal is inverted and inputted to the control terminal of the 3-state inverter 502 and makes the 3-state inverter 502 ENABLE and brings the oscillation drive circuit 405 into an active state. Meanwhile, the Low signal is inputted to the control terminals of the pull-down switches 507 and 508 and brings the pull-down switches 507 and 508 into an OFF state.

Further, the Low signal is inverted and inputted to the control terminal of the 3-state buffer 501a and makes the 3-state buffer 501a ENABLE and the High signal is inverted and inputted to the control terminal of the 3-state buffer 501b and makes the 3-state buffer 501b DISABLE.

At this occasion, the condensers 505 and 506 stay in a zero electric charge state and accordingly, large current is flowed in the oscillation drive circuit 405 and an initial signal constituting a basis of self-excited oscillation is generated in the oscillation drive circuit 405. The initial signal is inputted to the first electrode pattern 103a, excites the piezoelectric element 102 and the oscillator 101 and is inputted from the oscillator 101 to the 3-state inverter 502 to be inverted and amplified and the inverted and amplified initial signal charges or discharges the condenser 506 via the resistor 504 to thereby adjust the phase and is inputted to the input terminal of the 3-state buffer 501a to be amplified further. In this way, the initial signal is repeatedly reverted, amplified and amplified and is amplified to an excitation signal capable of carrying out oscillation.

Further, the large initial signal is amplified to the excitation signal by a small number of times of amplification and accordingly, a time period required for rise of the ultrasonic motor is shortened, oscillation self-starting performance is promoted and high reliability is achieved.

Further, the excitation signal is set to a predetermined phase by the condensers 505 and 506 and the excitation signal with the natural frequency as a major component is permanently generated.

Thereafter, the oscillator 101 generates a flection standing wave having the natural frequency and is brought a into contact with the moving body 108 at predetermined timings and the moving body 108 exerted with frictional force is rotated in the forward direction.

Meanwhile, when Low signal is outputted from the second output terminal 110*b* of the Start/stop and normal and reverse rotation signal generating means 110, the inverted Low signal is inputted to the control terminal of the 3-state buffer 501*a* and makes the 3-state buffer 501*a* DISABLE and the inverted High signal is inputted to the control terminal of the 3-state buffer 501*b* and makes the 3-state buffer 501*b* ENABLE.

In this case, the excitation signal is inputted to the second electrode pattern 103*b* of the piezoelectric element 102, the oscillator 102 generates a flection standing wave having a phase which differs by ¼ wavelength and the moving body 108 is rotated in the rearward direction.

Figure 6:
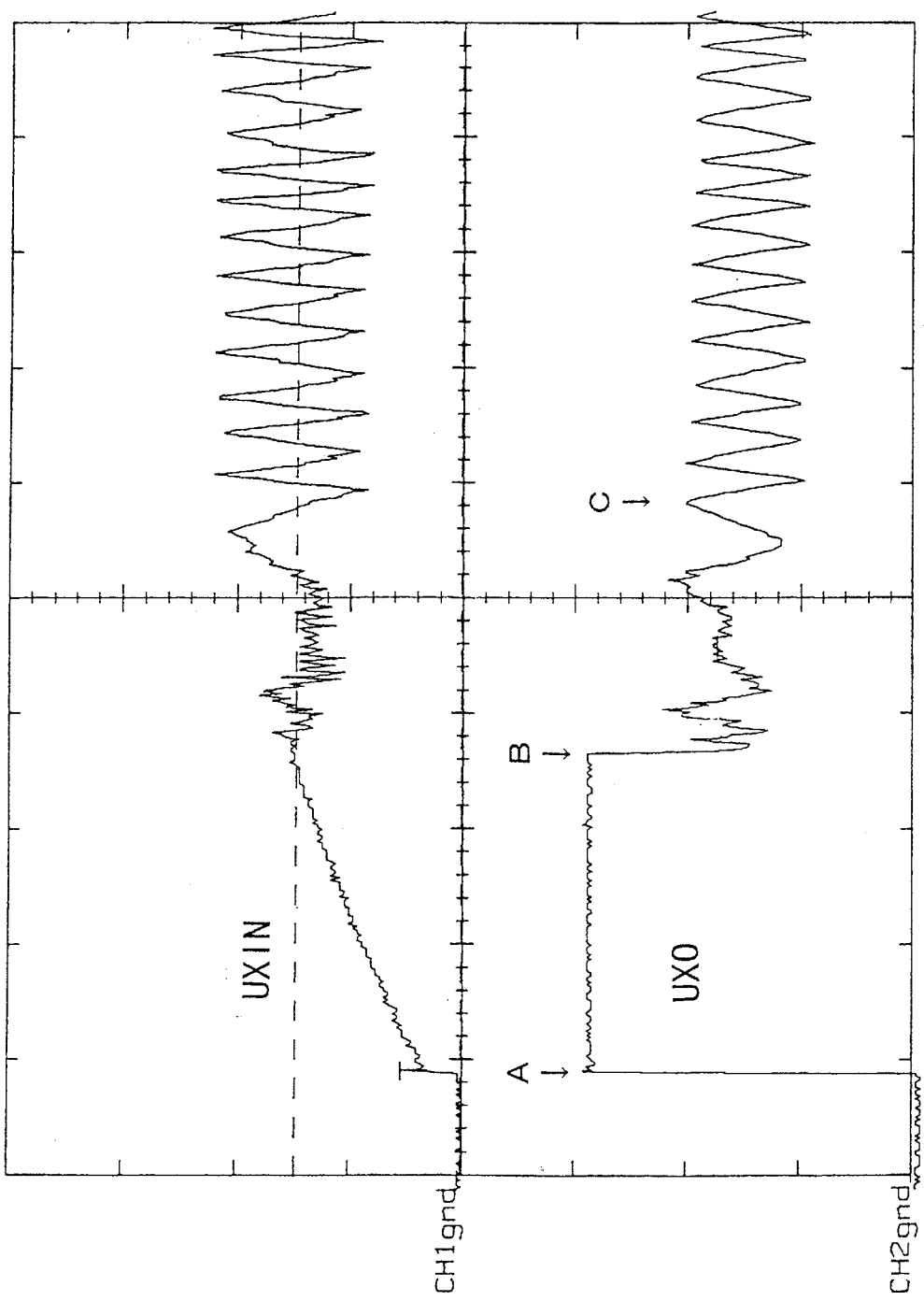
FIG. 6 is a diagram showing timing charts of circuit operation when oscillation rises according to the first embodiment of the ultrasonic motor to which the invention is applied.

FIG. 6 is a timing chart of circuit operation when the oscillation rises.

At this occasion, an explanation will be given of the principle of operating the oscillation drive circuit 405 in reference to FIG. 6. When the ultrasonic motor stays in a stop state based on outputs from the Start/stop and normal and reverse rotation signal generating means 110, outputs of the 3-state inverter 502 as well as the 3-state buffers 501*a* and 501*b* are under a high impedance state and the pull-down switches 507 and 508 as switching circuits stay in an ON state. That is, the input terminals and the output terminals of the 3-state inverter 502 and the 3-state buffers 501*a* and 501*b* become LOW.

In this occasion, when the start-stop signal generating means outputs start instruction, the 3-state inverter 502 and the 3-state buffer 501*a* or 501*b* are brought into an active state and the pull-down switches as switching circuits are brought into an OFF state. At this time point, the 3-state inverter outputs HIGH to the output terminal since the input terminal is LOW whereas the 3-state buffer 501*a* or 501*b* outputs LOW to the output terminal since the input terminal is LOW. Since the output terminal of the 3-state inverter 502 is HIGH, the condenser 505 starts charging via the feedback resistor 503 and the condenser 506 starts charging via the resistor 504. According to the embodiment, the feedback resistor 503 is as considerably high as 1 MΩ and accordingly, time constant τ1 of the feedback resistor 503 and the condenser 505 is higher than time constant τ2 of the resistor 504 and the condenser 506, therefore, the 3-state buffer 501*a* or 501*b* outputs HIGH since input voltage exceeds inversion voltage (timing A of FIG. 6).

Next, input voltage of the 3-state inverter 502 exceeds inversion voltage and LOW is outputted (timing B of FIG. 6).

Thereafter, the operating point of the 3-state inverter 502 is determined and the 3-state inverter 502 inputs a signal with the natural frequency generated in the oscillator 101 as a major component, carries out inversion and amplification and repeatedly charge and discharge the condenser 506 via the resistor 504. The 3-state buffer 501*a* or 501*b* inputs the signal for charging or discharging the condenser 506 and drives to excite the piezoelectric element 102.

A feedback loop is constituted by the 3-state inverter 502, the resistor 504, the condenser 506, the 3-state buffer 501*a* or 501*b* and the condenser 505, the signal constituting the major component generated at the oscillator 101 becomes a drive signal which is inverted and amplified by the feedback loop and the piezoelectric element 101 carries out stable and continuing self-excited oscillation (timing C of FIG. 6).

Simultaneously therewith the moving body 108 is frictionally driven by an oscillation wave generated in the oscillator 101 bonded with the piezoelectric element 102.

By the above-described procedure, according to the embodiment, large current flows at a moment at which the oscillation drive circuit 405 is brought into an active state in accordance with the output from the Start/stop and normal and reverse rotation signal generating means 110, the initial signal constituting the basis of the self-excited oscillation becomes easy to generate and is amplified to the excitation signal in a short period of time by a small number of times of amplification and accordingly, excellent response is achieved even in the restarting operation. Further, the highly reliable ultrasonic motor having the stable oscillation rise characteristic is realized.

Further, the operation of making the pull-down switches 507 and 508 as switching circuits stay in an ON state when the oscillation drive circuit 405 stays in a stop state, achieves also an effect in which the input terminals of the 3-state inverter 502 and the 3-state buffers 501*a* and 501*b* are fixed to predetermined potentials, that is, LOW level in this case and feed-through current is restrained. Further, the pull-down switches 507 and 508 as switching circuits can stop oscillation of the oscillation drive circuit 405 by being brought into an ON state in driving the motor and accordingly, they can be utilized as means for rapidly stopping the ultrasonic motor by instantaneously suppressing remaining oscillation of the oscillator 101 which is observed when the ultrasonic motor is stopped.

Second Embodiment

Figure 7:
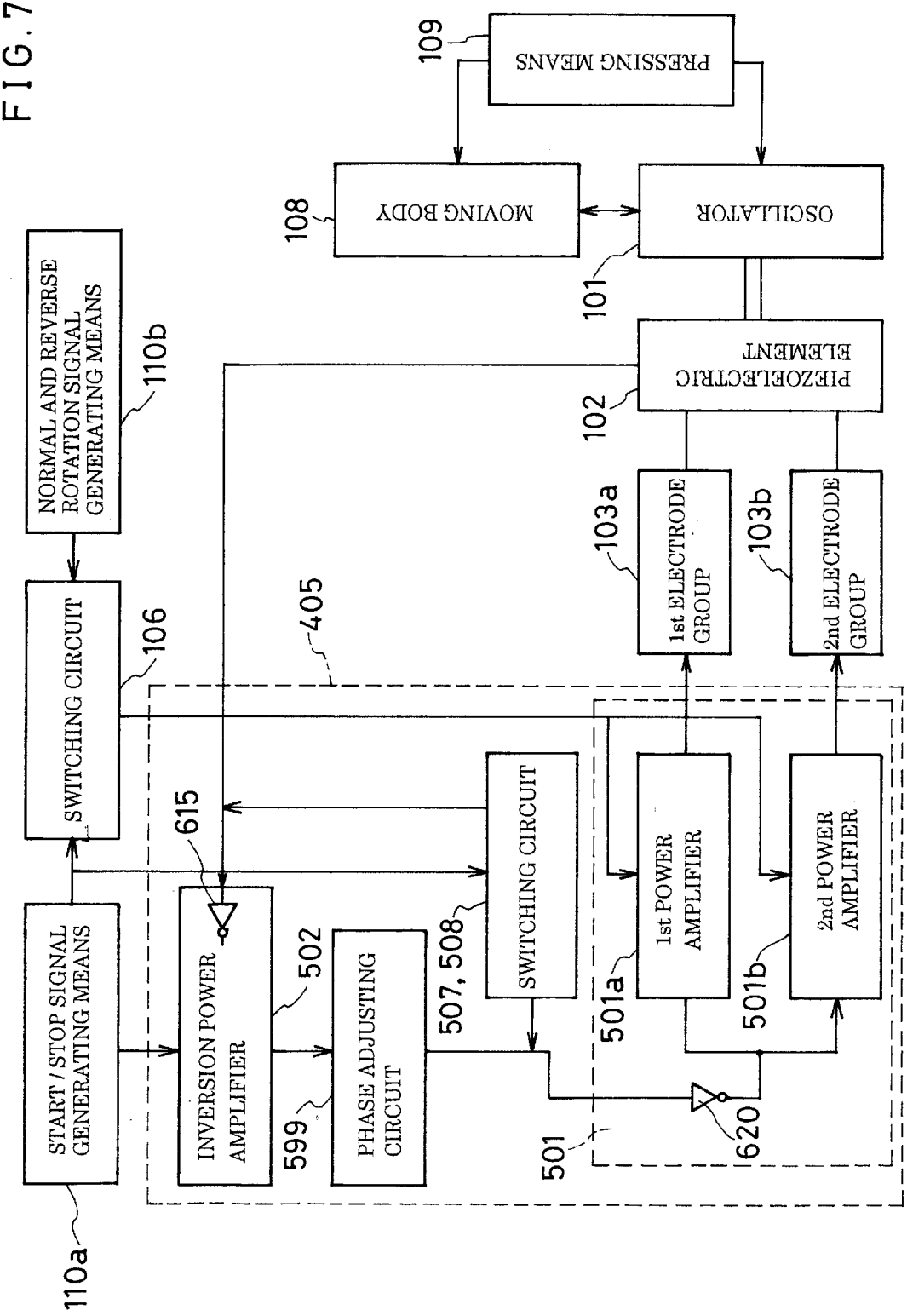
FIG. 7 is a block diagram according to a second embodiment of an ultrasonic motor to which the invention is applied.

FIG. 7 is a block diagram according to a second embodiment of an ultrasonic motor to which the invention is applied.

At least two sets of the electrode groups 103*a* and 103*b* comprising a plurality of electrodes are formed on the surface of the piezoelectric element 102.

The piezoelectric element 102 and the oscillator 101 operate as a mechanical filter in respect of the oscillation drive circuit 405 and a signal with the natural frequency as a major component is generated in the oscillator 101.

An inverting power amplifier 502 comprises an inverter 615 at its input unit, inputs an excitation signal generated by an electrode 103*c* formed on another face of the piezoelectric element 102 or the oscillator 101, inverts and amplifies the excitation signal and outputs the excitation signal to a phase adjusting circuit 599 which is a capacitive circuit.

The phase adjusting circuit 599 constituting a capacitive circuit inputs the excitation signal outputted from the inverting power amplifier 502, carries out phase adjustment of the excitation signal and outputs the excitation signal to a power amplifier 501.

The power amplifier 501 comprises an inverter 620 at its input unit and at least two power amplifiers 501*a* and 501*b* where an output from the inverter 620 is connected thereto and output terminals of the at least two power amplifiers 501*a* and 501*b* are respectively connected to the two sets of electrode groups 103*a* and 103*b* formed on the surface of the piezoelectric element 102 to thereby drive to excite the respective electrode groups independently from each other.

Start/stop signal generating means 110a outputs a signal of controlling the operation of the inverting power amplifier 502, the power amplifier 501 and the switching circuits 507 and 508.

Normal and reverse rotation signal generating means 110b outputs forward and rearward rotation signals for setting the rotational direction of the moving body 108 to the switching circuit 106. An output terminal of the switching circuit 106 is connected to the two power amplifiers 501a and 501b of the power amplifier 501 and selects at least one of the two power amplifiers 501a and 501b based on the output signal from the start/stop signal generating means 110a and the output signal from the normal and reverse rotation signal generating means 110b. In this case, when the power amplifiers operated by the output signal from the switching circuit 106 are switched, the rotational direction of the moving body is reversed.

The switching circuits 507 and 508 are made ON/OFF based on the control signal outputted from the start/stop signal generating means 110a.

Figure 8:
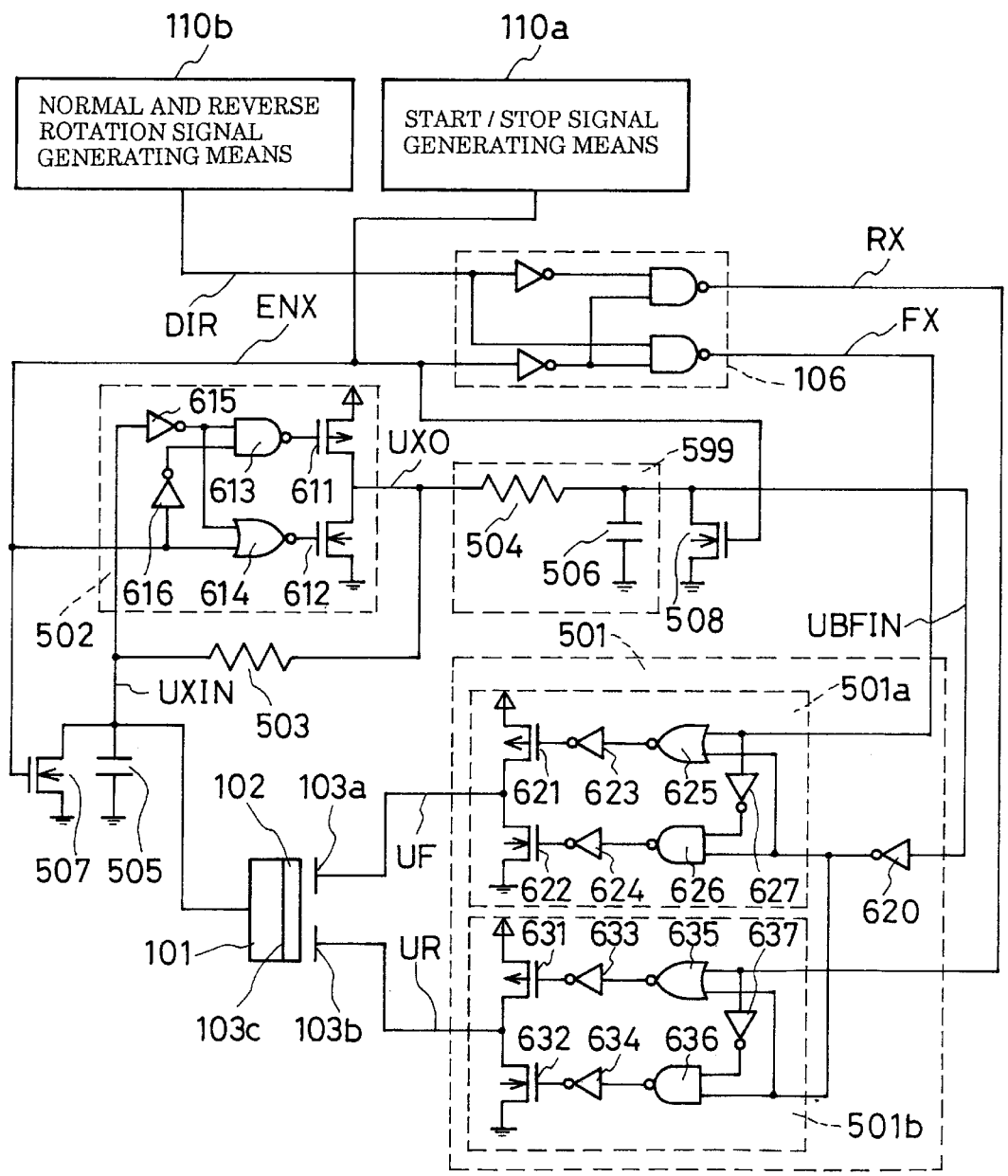
FIG. 8 is a constitution diagram of an oscillation drive circuit according to the second embodiment of the ultrasonic motor to which the invention is applied.

FIG. 8 is a constitution diagram of an oscillation drive circuit according to the second embodiment of the ultrasonic motor to which the invention is applied.

The oscillator 101 is bonded with the piezoelectric element 102 formed with the two sets of electrode groups 103a and 103b comprising a plurality of electrodes on one plane by adhesion or the like. The oscillator 101 serves also as an electrode and is connected to the input terminal of the 3-state inverter 502, one end of the condenser 505 and one end of the pull-down switch 507 constituting a switching circuit. Other end of the condenser 505 and other end of the pull-down switch 507 are grounded.

The 3-state inverter 502 serves as an inverting power amplifier for inverting and amplifying an electric signal constituting excitation information from the electrode 103c formed on the piezoelectric element 102 or the oscillator 101.

The 3-state inverter 502 inputs the excitation signal from the piezoelectric element 102 at an inverter 615 and the inverter 615 drives respectively a Pch transistor 611 and an Nch transistor 612 via NAND 613 and NOR 614 constituting prebuffers of poststages and outputs an inverted and amplified signal.

The resistor 503 is feedback resistor connected to the 3-state inverter 502 in parallel therewith and stabilizes the operating point of the 3-state inverter 502.

The phase adjusting circuit 599 is constituted by the resistor 504 and a condenser 506, an output terminal of the 3-state inverter 502 is connected to one end of the resistor 504 and other end thereof is connected to one end of the condenser 506 and input terminals of the pull-down switch 508 and the 3-state buffer 501. The phase adjusting circuit 599 inputs the excitation signal outputted from the 3-state inverter 502, carried out phase adjustment of the excitation signal and outputs the excitation signal to the 3-state buffer 501.

The 3-state buffer 501 inputs the excitation signal outputted from the phase adjusting circuit 599 at an inverter 620 and outputs the excitation signal to at least two sets of 3-state buffers 501a and 501b at poststages. Output terminals of the two sets of 3-state buffers 501a and 501b are respectively connected to the two sets of electrode groups 103a and 103b formed on one plane of the piezoelectric element 102.

Respective arrangement of the two sets of 3-state buffers 501a and 501b right in front of the two electrode groups 103a and 103b formed on the piezoelectric element 102 is very effective for obtaining high output from the ultrasonic motor since the piezoelectric element 102 is basically a capacitive load in addition to the fact that the condensers 505 and 506 are connected to the input terminal and the output terminal of the 3-state inverter 502 with objects of phase adjustment, direct current cutting and so on.

The normal and reverse rotation signal generating means 110b outputs forward and rearward signals for setting the rotational direction of the ultrasonic motor to the switching circuit 106. Output terminals of the switching circuit 106 are respectively connected to control terminals of the two sets of 3-state buffers 501a and 501b of the oscillation drive circuit 405, make one of the two sets of 3-state buffers 501a and 501b as a normal buffer, that is, bring it into an active state and bring the output terminal of other buffer into a high impedance state to make DISABLE based on the output signal from the normal and reverse rotation signal generating means 110b.

The oscillator 101 is driven by the 3-state buffer which is selected by the output signal from the switching circuit 106 and is brought into an active state. According to the oscillator 101, when the 3-state buffer constituting an active state is interchanged by the switching circuit 106, the rotational direction of the ultrasonic motor is reversed.

When stopping the ultrasonic motor, the output from the 3-state inverter 502 is brought into a high impedance state by the output signal from the start/stop signal generating means 110a. At the same time, the pull-down switches 507 and 508 are made ON and electric charge remaining in the condensers 506 and 507 is swiftly discharged and rise of oscillation is made smooth in the restarting operation. Further, there also achieves an effect in which the input signal of the 3-state inverter 502 and the input terminal of the 3-state buffer 501 become LOW and feed-through current is restrained. At the same time, both of outputs of the two 3-state buffers 501a and 501b are brought into a high impedance state by the output signals from the switching circuit 106 outputted based on the output signals from the start/stop signal generating means 110a and the normal and reverse rotation signal generating means 110b and the ultrasonic motor can be stopped.

The pull-down switches 507 and 508 achieve an effect of restraining prolongation of a time period of rise of oscillation in restarting operation by electric charge remaining in the condensers 506 and 507 immediately after stopping the ultrasonic motor. Further, the pull-down switches 507 and 508 achieve and effect of restraining feed-through current by setting the input terminals of the respective power amplifiers to fixed potentials in stopping the motor. Further, the pull-down switches 507 and 508 as switching circuits can stop oscillation of the oscillation drive circuit 405 by being brought into an ON state in driving the motor and accordingly, they can be utilized also as means for rapidly stopping the ultrasonic motor by instantaneously suppressing remaining oscillation of the oscillator 101 which is observed when stopping the ultrasonic motor.

Next, an explanation will be given of the operation of the oscillation drive circuit 405 in starting it.

When the ultrasonic motor stays in a stop state, the start/stop signal generating means 110a outputs HIGH to control signal ENX and the normal and reverse rotation signal generating means 110b outputs HIGH in the case of forward rotation and LOW in the case of rearward rotation to control signal DIR. The switching circuit 106 receives LOW input of the control signal ENX and outputs HIGH to control signals FX and RX. When the control signal ENX is HIGH, outputs from the 3-state inverter 502 and the 3-state buffers 501a and 501b are brought into a high impedance state. When ENX is HIGH, the pull-down switches 507 and 508 are brought into an ON state and swiftly discharges electric charge remaining in the condensers 506 and 507 to thereby make excellent the oscillation rise characteristic in restarting operation. Further, input signal UXIN of the 3-state inverter 502 and input signal UBFIN of the 3-state buffer 501 are brought into LOW level.

When starting the ultrasonic motor, the start/stop signal generating means 110a outputs LOW to the control signal ENX. The 3-state inverter 502 inputs the input signal UXIN at LOW level immediately before starting operation and outputs HIGH to output signal UXO. When the control signal DIR outputted from the switching circuit 106 is HIGH, the 3-state buffer 501 inputs the input signal UBFIN at LOW level immediately before starting operation and outputs LOW to output signal UF. The pulldown switches 507 and 508 are brought into an OFF state by ENX=LOW.

The condenser 505 starts charging via the feedback resistor 503 since the outputs UXO from the 3-state inverter 502 is HIGH and the condenser 506 starts charging via the resistor 504. In this case, the feedback resistor 503 according to the embodiment makes use of high resistance of 1 MΩ and the time constant τ1 of the feedback resistor 503 and the condenser 505 is larger than the time constant τ2 of the resistor 504 and the condenser 506. Accordingly, firstly, voltage of input signal UBFIN of the 3-state buffer 501 exceeds inversion voltage of the inverter 620 installed as the input unit of the 3-state buffer 501 and the 3-state buffer 501 outputs HIGH to the output signal UF.

Next, when input voltage of the 3-state inverter 502 exceeds inversion voltage of the inverter 615, an output from the inverter 615 is inverted from HIGH to LOW and in accordance therewith both of NAND 613 and NOR 614 output HIGH. That is, input signals of the Pch transistor 611 and the Nch transistor 612 are provided with the same phase and accordingly, an output from the 3-state inverter 502 becomes necessarily HIGH or LOW and is not brought into a high impedance state.

That is, the operating point of the 3-state inverter 502 is determined only by the inversion voltage of the inverter 615 at the input unit and accordingly, even when the inversion voltage is increased or decreased, the Pch transistor 611 and the Nch transistor 112 are driven in the same phase and inversion and amplification are firmly operated.

Although strictly speaking, in transient response operation in which the output from the inverter 615 transits from HIGH to LOW or LOW to HIGH, there is conceivable a case in which the outputs from NAND 613 and NOR 614 are not in the same phase, voltage gain of the inverter 615 is sufficiently large and accordingly, a time period in which the outputs from NAND 613 and NOR 614 are not in the same phase is extremely short and probability by which the output from the 3-state inverter 502 is stabilized in a high impedance state is extremely small.

Further, although an explanation has been given thereof with an example of the 3-state inverter 502, a similar effect is achieved also in respect of the inverter 620 at the input unit of the 3-state buffer 501 and Pch transistors 621 and 631 and the Nch transistors 622 and 632 of the power amplifiers 501a and 501b at poststages.

Thereafter, the operating point of the 3-state inverter 502 is determined, the signal UXIN with the natural frequency as a major component generated in the oscillator 101 is inputted and outputted to the phase adjusting circuit 599 after having been divided and amplified. The 3-state buffer 501 amplifies the excitation signal UBFIN outputted from the phase adjusting circuit 599 and drives to excite the oscillator 101.

A feedback loop is constituted by the 3-state inverter 502, the phase adjusting circuit 599 and the 3-state buffer 501, a signal constituting a major component generated in the oscillator 101 becomes a drive signal which is inverted and amplified by the feedback loop and the piezoelectric element 101 carries out stable and continuing self-excited oscillation. Simultaneously therewith, the moving body 108 is frictionally driven by an oscillation wave generated on the oscillator 101 bonded with the piezoelectric element 102.

As mentioned above, by constituting to use the inverters 620 and 615 at the input units of the 3-state inverter 502 and the 3-state buffer 501, regardless of how the inversion voltages are varied by dispersion of semiconductor process or the like, in starting the oscillation drive circuit 405, that is, in starting the oscillation, the output terminals of the respective power amplifiers can be restrained from being brought into a high impedance state, excellent oscillation rise characteristic is obtained and the ultrasonic motor excellent in response and reliability can be realized.

Further, although in the embodiment, the pull-down switches are also used to make further excellent the oscillation rise characteristic in restarting operation, a similar effect is achieved only with a constitution using inverters at input units of respective power amplifiers even in the case of dispensing with the pull-down switches 507 and 508.

Third Embodiment

Figure 9:
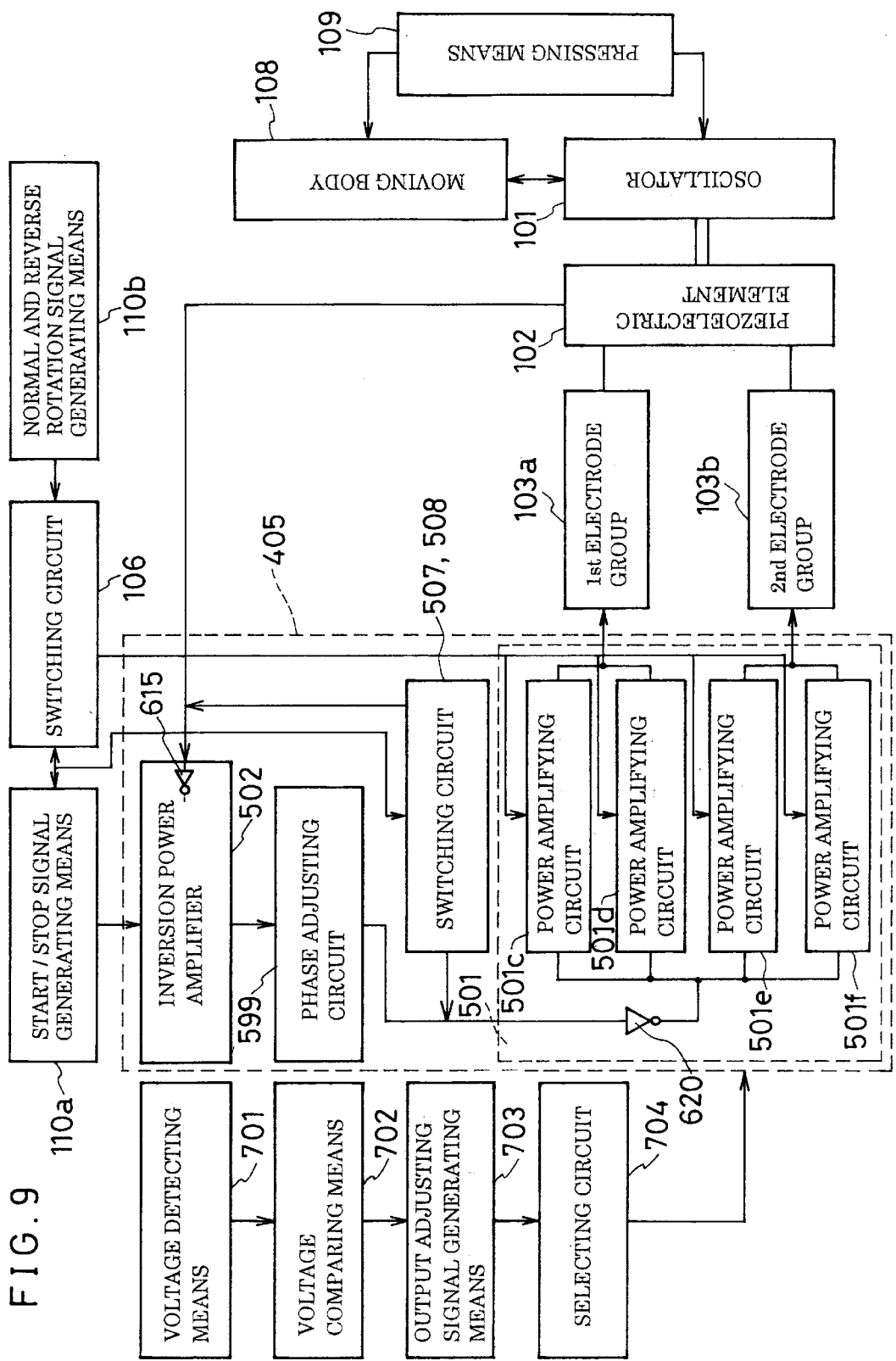
FIG. 9 is a block diagram according to a third embodiment of an ultrasonic motor to which the invention is applied.

FIG. 9 is a block diagram according to a third embodiment of an ultrasonic motor to which the invention is applied.

Although the embodiment is basically constructed by a constitution substantially similar to that of the second embodiment, the embodiment is featured in that power amplifying circuits 501c and 501d connected in parallel are used as the power amplifier 501a, power amplifying circuits 501e and 501f connected in parallel are used as the power amplifier 501b and there can be adjusted output impedances of the power amplifiers 501a and 501b output terminals of which are connected to the two sets of electrodes 103a and 103b of the piezoelectric element.

Voltage detecting means 701 detects power source voltage of power source and voltage comparing means 702 compares voltage detected by the voltage detecting means 701 with previously set power source voltage data and outputs comparison information to output adjusting signal generating means 703. According to the comparison information, when the previously set power source voltage data and power source voltage detected by the voltage detecting means 701 do not coincide with each other, the output adjusting signal outputting means 703 outputs control signal for adjusting output impedance of the output amplifier 501 to a selecting circuit 704.

The selecting circuit 704 selects operation of the power amplifying circuits 501d and 501f based on an output signal from the output adjusting signal generating means 703. That is, the power amplifying circuit 501c is made the basis of the power amplifier 501a, the power amplifying circuit 501e is made the basis of the power amplifier 501b and it is determined whether the power amplifying circuits 501d and 501f are added to the power amplifying circuits 501c and 501e in accordance with the output from the output adjusting signal generating means.

Figure 10:
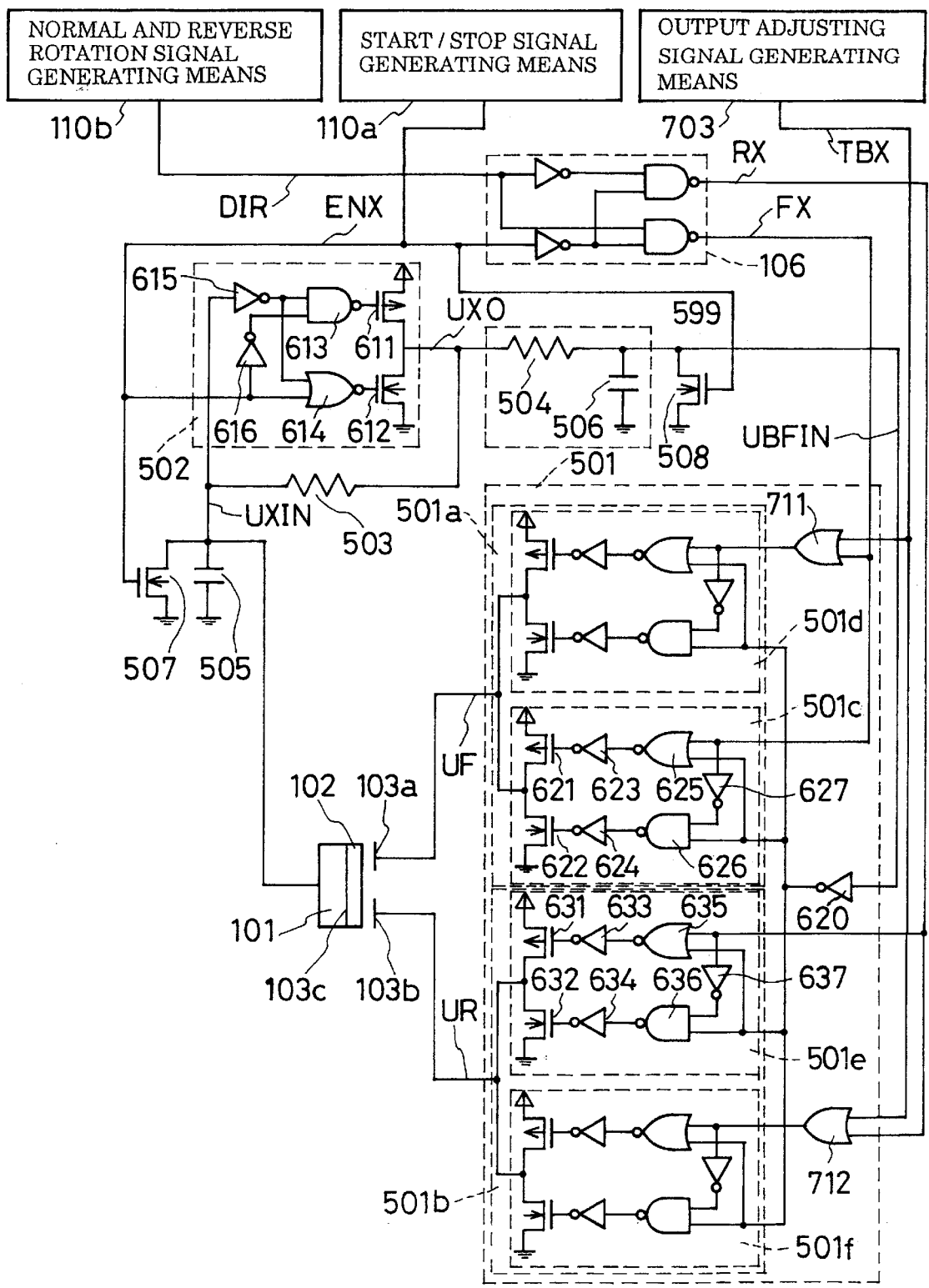
FIG. 10 is a constitution diagram of an oscillation drive circuit according to the third embodiment of the ultrasonic motor to which the invention is applied.

FIG. 10 is a constitution diagram of an oscillation drive circuit according to the third embodiment of an ultrasonic motor to which the invention is applied.

The embodiment is basically constructed by a constitution similar to that of the previous second embodiment and is featured in that the 3-state buffers 501c and 501d are connected in parallel as the power amplifier 501a and the power amplifying circuits 501e and 501f are connected in parallel as the power amplifier 501b.

The power adjusting signal generating means 703 outputs control signal TBX for selecting the operation of the 3-state buffers 501d and 501f for adjusting output impedance.

OR 711 and OR 712 serve as the selecting circuit 704 for selecting the operation of the 3-state buffers 501d and 501f based on the output signal TBX from the output adjusting signal generating means 703.

The operation of the 3-state buffers 501d and 501f is permitted based on a signal outputted from the selecting circuit 704 and output impedances of the 3-state buffers 501a and 501b are changed.

When the ultrasonic motor is driven to rotate forwardly, the start/stop signal outputting means 110a outputs LOW to the control signal ENX and the normal and reverse rotation signal generating means 110b outputs HIGH to the control signal DIR. The switching circuit 106 outputs LOW to FX and HIGH to RX based on the control signal ENX outputted from the start/stop signal outputting means 110a and the control signal DIR outputted from the normal and reverse rotation signal generating means 110b.

When the output adjusting signal outputting means 703 outputs HIGH to the output signal TBX, OR 711 and OR 712 constituting the selecting circuit 704 output HIGH, the operation of the 3-state buffers 501d and 501f is not permitted and the output is brought into a high impedance state.

When the output adjusting signal outputting means 703 outputs LOW to the output signal TBX, OR 711 constituting the selecting circuit 704 outputs LOW and OR 712 outputs HIGH. The operation of the 3-state buffer 501d is permitted in accordance with the LOW output. The 3-state buffer 501d is provided with a constitution quite the same as that of the 3-state butter 501c and therefore, the output impedance of the 3-state buffer 501a becomes a half of that of only the 3-state buffer 601c.

In the case of operation of reverse rotation, the normal and reverse rotation signal generating means 110b outputs LOW to the control signal DIR, the switching circuit 106 outputs HIGH to FX and LOW to RX, OR 711 outputs HIGH, OR 712 outputs LOW and accordingly, the operation of the 3-state buffer 501f is permitted and output impedance of the 3-state buffer 501b is halved.

Similar to the second embodiment, the embodiment is also constructed by the constitution in which the inverter 602 is used at the input unit of the 3-state buffer 501, a time period of rise of oscillation is shortened and conflict of output caused by a difference in transmittance delay time of the 3-state buffer 501c and the 3-state buffer 501d or the 3-state buffer 501e and the 3-state buffer 501f both connected in parallel is minimized which is very effective for stable operation and low dissipating operation of the ultrasonic motor.

Further, by the above-described constitution, the output impedance of the power amplifier 501 can be adjusted in accordance with a change in the power source voltage and desired output of the ultrasonic motor can easily be obtained even at low voltage.

Figure 11:
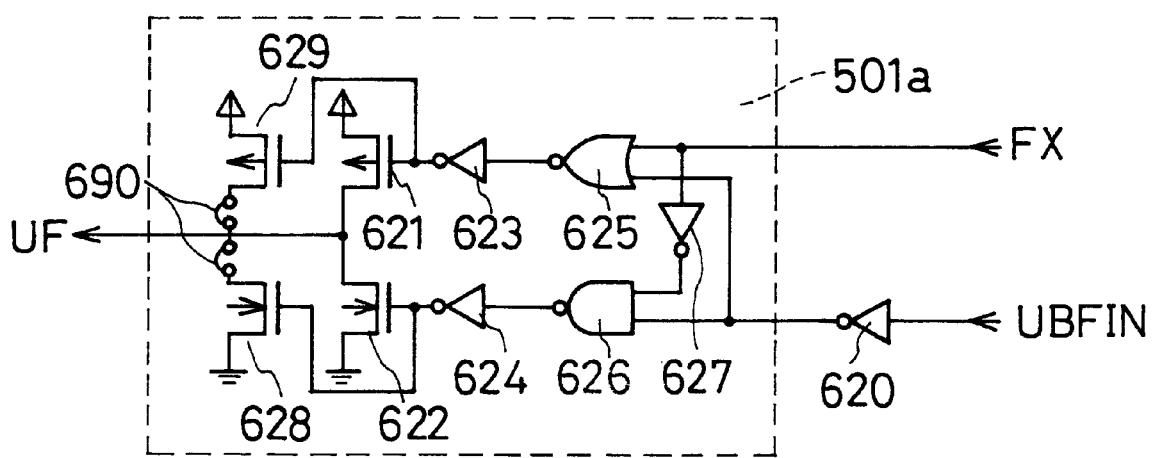
FIG. 11 is a constitution diagram of a power amplifier of an oscillation drive circuit according to a fourth embodiment of an ultrasonic motor to which the invention is applied.

Further, although according to the embodiment, the output of the motor is controlled by adjusting the output impedance of the power amplifier by detecting the power source voltage, the output impedance of the power amplifier 501 may be adjusted by detecting rotational number of the ultrasonic motor Fourth Embodiment FIG. 11 is a constitution diagram of a power amplifier of an oscillation drive circuit according to a fourth embodiment of an ultrasonic motor to which the invention is applied.

The embodiment is the same as the previous second embodiment in the basic constitution and featured in the constitution of the 3-state buffers 501a and 501b. Constitutions of the 3-state buffers 501a and 501b are quite the same as each other and FIG. 11 shows only the 3-state buffer 501a.

The embodiment is featured in that a Pch transistor 628 is connected to the Pch transistor 621 and an Nch transistor 629 is connected to the Nch transistor 622 respectively in parallel therewith and connection of drain sides of the Pch transistor 628 and the Nch transistor 629 can be cut.

Gate inputs of the Pch transistor 628 and the Nch transistor 629 are driven by outputs from prebuffers 623 and 624 the same as gate inputs of the Pch transistor 621 and the Nch transistor 622 and accordingly, regardless of presence or absence of connection 690 between the drain sides of the Pch transistor 628 and the Nch transistor 629, loads in view from the prebuffers 623 and 624 remain unchanged and accordingly, gate signals of the Pch transistor 628 and Nch transistor 629 are not influenced by presence or absence of connection of the drain sides.

Thereby, the output impedance can be changed without effecting significant influence on the phase condition of the excitation signal.

Further, although in the embodiment, the constitution is applied to the 3-state buffers 501a and 501b in the constitution of the previous second embodiment, even in the third embodiment in which the output impedance of the power amplifier can be adjusted, the constitution can similarly be applied to the 3-state buffers 501c, 501d, 501e and 501f and the 3-state inverter 502.

Fifth Embodiment

Figure 12:
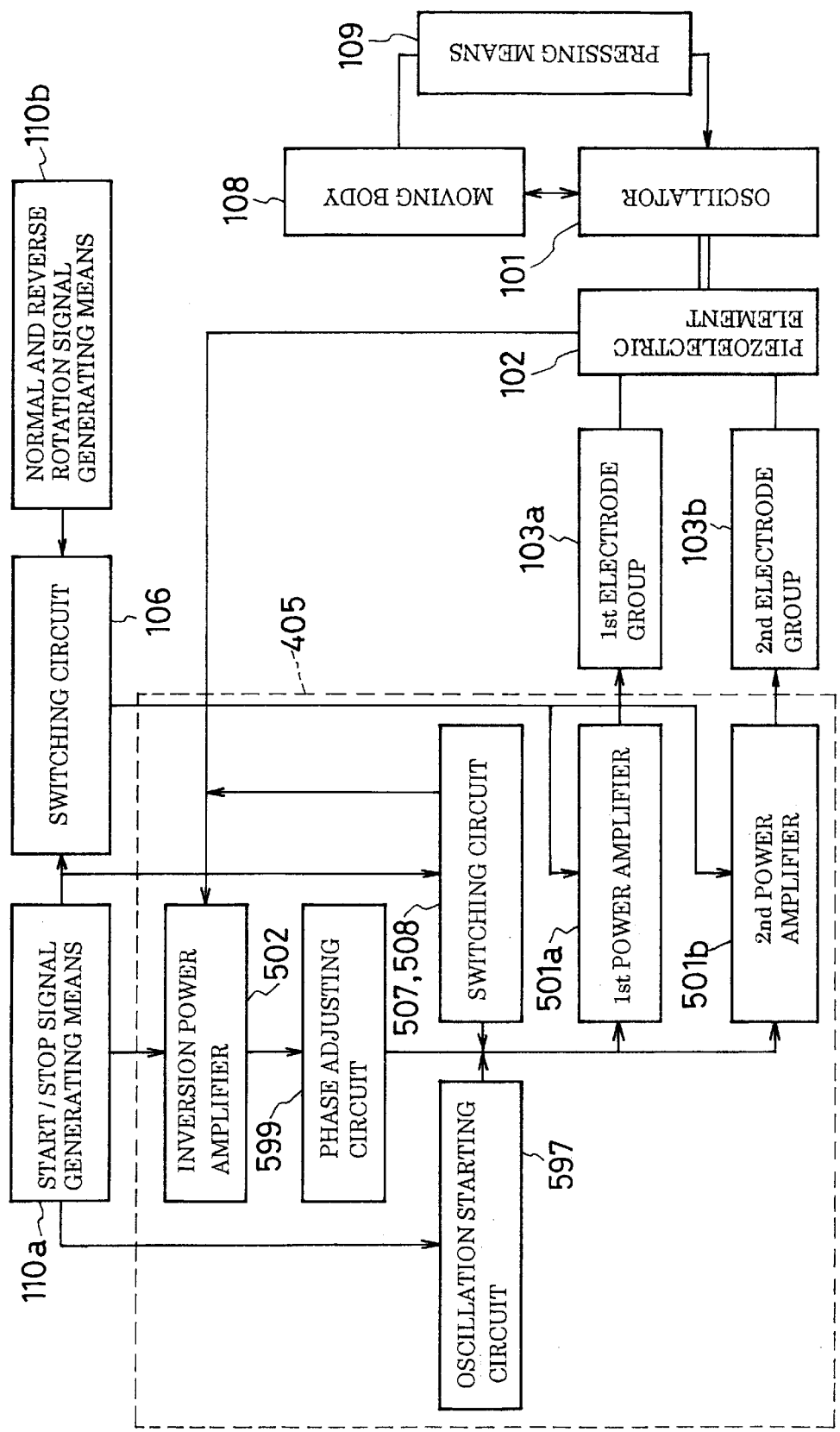
FIG. 12 is a block diagram according to a fifth embodiment of an ultrasonic motor to which the invention is applied.

FIG. 12 is a block diagram according to a fifth embodiment of an ultrasonic motor to which the invention is applied.

The basic constitution is similar to that in the previous first embodiment and it is the feature of the embodiment that there is provided an oscillation starting circuit 597 for generating oscillation start trigger based on the output from the start/stop signal generating means 110a during a time period of rise of oscillation of the oscillation drive circuit 405.

Figure 13:
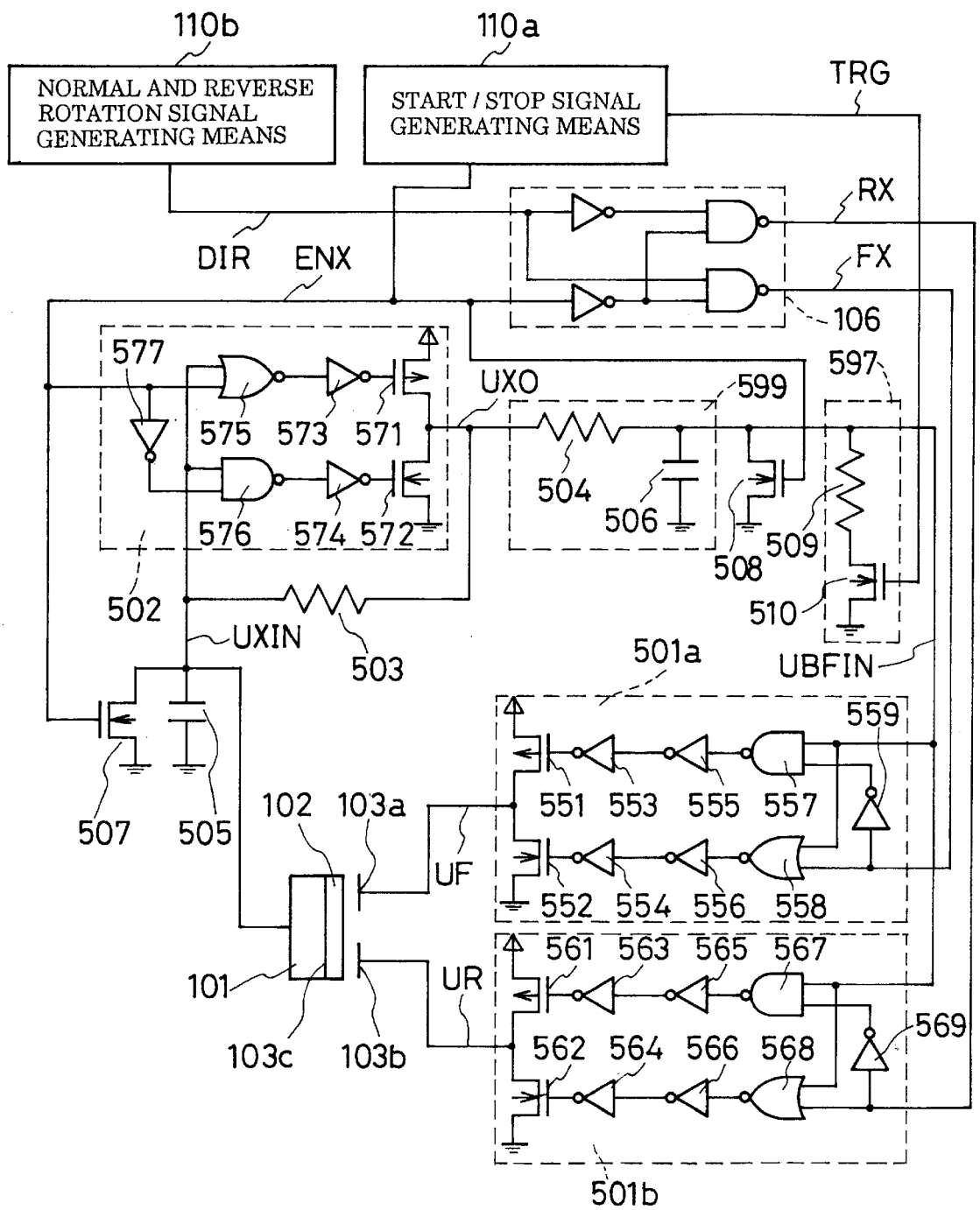
FIG. 13 is a constitution diagram of an oscillation drive circuit according to the fifth embodiment of the ultrasonic motor to which the invention is applied.

FIG. 13 is a constitution diagram of an oscillation drive circuit according to the embodiment.

The oscillator 101 is bonded with the piezoelectric element 102 formed with the two sets of electrode groups 103a and 103b comprising a plurality of electrodes on one plane by means of adhesion or the like. The oscillator 101 serves also as an electrode and is connected to the 3-state inverter 502, the condenser 505 and the pull-down switch 507 as a switching circuit. Other end of the condenser 505 is grounded.

The 3-state inverter 502 serves as an inverting power amplifier for inverting and amplifying an electric signal which is excitation information from the electrode 103c formed on the surface of the piezoelectric element 102 or the oscillator 101. The resistor 503 is connected to the 3-state inverter 502 in parallel therewith and stabilizes the operating point of the 3-state inverter 502.

The phase adjusting circuit 599 which is a capacitive circuit inputs the excitation signal outputted from the 3-state inverter 502 and carries out phase adjustment of the excitation signal and outputs the excitation signal to the two sets of 3-state buffers 501a and 501b. The phase adjusting circuit 599 which is a capacitive circuit is constituted by the resistor 504 and the condenser 506, an output from the 3-state inverter 502 is connected to one end of the resistor 504 and other end is connected to the condenser 506, the pull-down switch 508 as a switching circuit and input terminals of the two sets of 3-state buffers 501a and 501b. Other end of the condenser 506 is grounded.

The oscillation starting circuit 597 is constituted by a circuit connecting a resistor 509 having a predetermined resistance value and a pull-down switch 510 in series and is connected to the pull-down switch 508 as a switching circuit in parallel therewith.

The input terminals of the two 3-state buffers 501a and 501b are respectively connected to the two sets of electrode groups 103a and 103b formed on one plane of the piezoelectric element 102. Respective arrangement of the two 3-state buffers 501a and 501b right in front of the two electrode groups 103a and 103b formed on the piezoelectric element 102, is very effective for obtaining high output from the ultrasonic motor since the piezoelectric element 102 is basically a capacitive load in addition to the fact that the condensers 505 and 506 are connected to the input terminal and the output terminal of the 3-state inverter 502 with purposes of phase adjustment, direct current cutting and so on.

The normal and reverse rotation signal generating means 110b outputs forward and rearward rotation signals for setting the rotational direction of the ultrasonic motor to the switching circuit 106. Output terminals of the switching circuit 106 are respectively connected to the control terminals of the two 3-state buffers 501a and 501b of the oscillation drive circuit 405, make one of the two 3-state buffers 501a and 501b function as a normal buffer and bring an output terminal of other buffer in a high impedance state to make it DISABLE based on the output signal from the normal and reverse rotation signal generating means 110b.

The oscillator 101 is driven by the 3-state buffer which is selected by the output signal from the switching circuit 106 and functions as a normal buffer. That is, the oscillator 101 is driven only by the 3-state buffer which is brought into an active state by the switching circuit 106, that is, which is permitted to function as a normal buffer and when the 3-state buffers which are brought into an active state by the switching circuit 106 are interchanged, the rotational direction of the ultrasonic motor is reversed.

When stopping the ultrasonic motor, the output from the 3-state inverter 502 is brought into a high impedance state by an output signal from the start-stop signal generating means 110a. Simultaneously therewith, both of outputs from the two 3-state buffers 501a and 501b are brought into a high impedance state by the output signal from the switching circuit 106 outputted based on output signals from the start-stop signal generating means 110a and the normal and reverse rotation signal generating means 110b and the ultrasonic motor can be stopped.

Further, the pull-down switches 507 and 508 as switching circuits are brought into an ON state based on the output signal from the start/stop signal generating means 110a and the characteristic of rise of oscillation in restarting operation is made excellent.

In this case, both of the pull-down switches 507 and 508 as switching circuits and the oscillation starting circuit comprising the resistor 509 and the pull-down switch 510 are for making excellent the characteristic of rise of oscillation in starting the oscillation drive circuit 405. Although according to the embodiment, both of them are integrated to the oscillation drive circuit 405, the effect is achieved only with either of the switching circuits and the oscillation starting circuit. According to the embodiment, both of the switching circuits and the oscillation starting circuit are integrated and there is provided the reliable ultrasonic motor having particularly excellent characteristic of rise of oscillation and high response.

Figure 14:
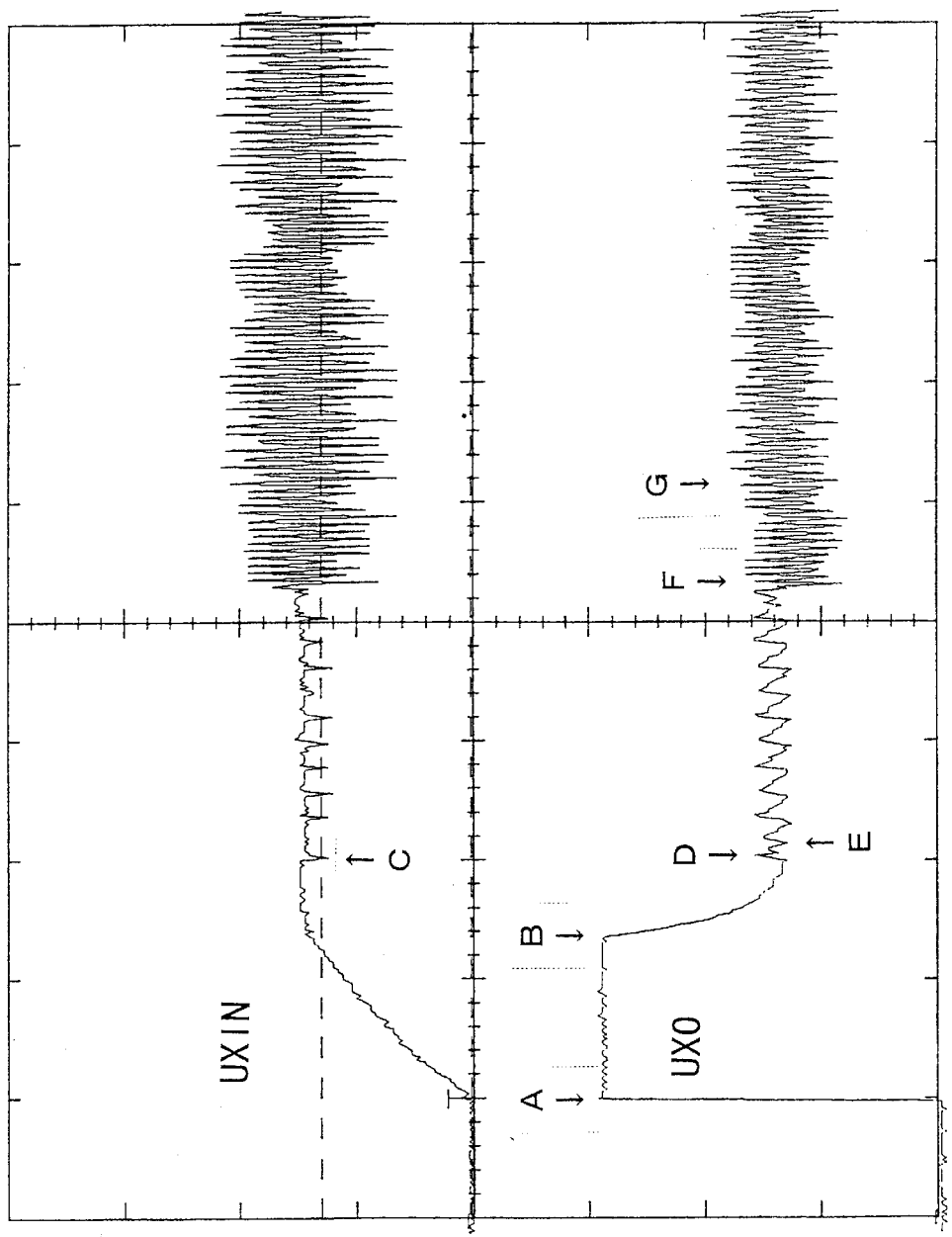
FIG. 14 is a diagram showing timing charts of circuit operation when oscillation rises according to the fifth embodiment of the ultrasonic motor to which the invention is applied.

FIG. 14 is a timing chart of circuit operation when the oscillation according to the embodiment rises.

A detailed explanation will be given of a method of starting the ultrasonic motor and its operation in reference to the timing chart of FIG. 14.

When the ultrasonic motor stays in a stop state, the start/stop signal generating means 110a outputs HIGH to the control signal ENX and the normal and reverse rotation signal generating means 110b outputs HIGH to the control signal DIR in the case of forward rotation and outputs LOW thereto in the case of rearward rotation. The switching circuit 106 receives an input at Low level of the control signal ENX and outputs HIGH to the control signals FX and RX. When the control signal ENX is HIGH, outputs from the 3-state inverter 502 and the 3-state buffers 501a and 501b are brought into a high impedance state. The pull-down switches 507 and 508 are brought into an ON state when ENX is HIGH, discharge remaining electric charge of the condensers 505 and 506 during a time period where the ultrasonic motor is stopped and prepare such that smooth oscillation rise can be carried out in restarting operation. Further, at the same time, the input signal UXIN of the 3-state inverter 502 and the input signal UBFIN of the 3-state buffers 501a and 501b are brought into LOW level.

When the ultrasonic motor is started, the start/stop signal generating means 110a outputs LOW to the control signal ENX and starts the operation of the oscillation drive circuit 405. The 3-state inverter 502 inputs the input signal UXIN=LOW immediately before starting and outputs HIGH to the output signal UXO. When the control signal DIR outputted from the switching circuit 106 is HIGH, the 3-state buffer 501a inputs the input signal UBFIN=LOW immediately before starting and outputs LOW to the output signal UF. The pull down switches 507 and 508 are brought into an OFF state by ENX=LOW.

The condenser 505 starts charging via the feedback resistor 503 by the output UXO=HIGH of the 3-state inverter 502 and the condenser 506 starts charging via the resistor 504. According to the embodiment, the feedback resistor 503 uses a very high resistance of 1 MΩ and the time constant τ1 of the feedback resistor 503 and the condenser 505 is larger than the time constant τ2 of the resistor 504 and the condenser 506. Accordingly, first, voltage of the input signal UBFIN of the 3-state buffer 501a exceeds inversion voltages of a prebuffer 557 and a prebuffer 558 of the 3-state buffer 501a (timing A of FIG. 14) and the 3-state buffer 501a outputs HIGH to the output signal UF.

At this occasion, there is a case in which when, for example, power source voltage is 3.0 V, inversion voltage of the Pch prebuffer 575 of the 3-state inverter 502 is 1.4 V and inversion voltage of an Nch prebuffer 576 is 1.6 V, input voltage of the 3-state inverter 502 rises from 0 V to 1.4 V, both of a Pch transistor 571 and an Nch transistor 572 are brought into an OFF state, that is, the output from the 3-state inverter 502 is brought into a high impedance state (timing B of FIG. 14).

In such a case, when the output from the 3-state inverter 502 is brought into a high impedance state, a closed circuit of the condenser 505, the condenser 506, the resistor 503 and the resistor 504 is constituted and the condenser 506 starts discharging by a potential difference between the condenser 505 and the condenser 506 (timing B–C of FIG. 14).

In this case, the pull-down switch 510 as the oscillation starting circuit for generating an oscillation start trigger signal is made ON by a control signal TRG outputted from the start/stop signal generating means 110a.

When the pull-down switch 510 is made ON, the input potential of the 3-state buffer 501a becomes equal to or lower than the inversion voltages of the prebuffer 557 and the prebuffer 558 and the 3-state buffer 501a outputs LOW.

At the moment when the 3-state buffer 501a outputs LOW, the piezoelectric element 102 maintains a potential between the electrode 103a and the electrode 103c or the oscillator 101. Therefore, the potential of the input signal UXIN of the 3-state inverter 502 is lowered (timing C of FIG. 14) and becomes equal to or lower than inversion voltage of the Pch prebuffer 575 of the 3-state inverter 502, the Pch transistor 571 is made ON and the 3-state inverter 502 outputs HIGH.

When the 3-state inverter 502 outputs HIGH, the potential of the input signal UBFIN of the 3-state buffers 501a and 501b is elevated (timing D of FIG. 14) and exceeds the inversion voltage of the prebuffer 557 of the 3-state buffer 501a and the 3-state buffer 501a outputs an original value of HIGH.

Then, the potential of UXIN returns to an original value, exceeds inversion voltage of the Pch prebuffer 575 of the 3-state inverter 502, the Pch transistor 571 is made OFF and the output from the 3-state inverter 502 returns to the high impedance state.

When the output from the 3-state inverter 502 is brought into the high impedance state, a closed circuit is constituted by the condenser 505, the resistor 503, the resistor 504, the resistor 509 and pull-down switch 510 constituting the oscillation starting circuit and the condenser 506 starts discharging (timing D–E of FIG. 14).

As explained above, a feedback loop is constituted by making the outputs from the 3-state buffer 501a and the 3-state inverter 502 ON and OFF for some time period. Thereby, the oscillator 101 having the piezoelectric element 102 starts self-excited oscillation and reaches oscillation by the natural frequency generated in the oscillator 101 (timing F of FIG. 14). Simultaneously therewith, the moving body is frictionally driven by an oscillation wave generated in the oscillator 101 bonded with the piezoelectric element 102.

After the piezoelectric element 102 has started self-excited oscillation, the pull-down switch 510 generating the oscillation starting trigger is made OFF by the control signal TRG outputted from the start/stop signal generating means 110a.

Further, in respect of timing of making ON the pull-down switch 510 generating the oscillation starting trigger, even when the timing is started before the output of the 3-state inverter 502 reaches the high impedance state, the same effect is achieved. That is, depending on a dispersion in semiconductor process, there is a possibility in which the output of the 3-state inverter 502 is brought into the high impedance state at rise of oscillation and an explanation has been given of the principle of operation in the embodiment with such a case as an example, however, even when such a state is not brought about, provision of the oscillation starting circuit achieves an effect of making excellent the rise characteristic of oscillation.

Further, although a description has been given of the case of forward rotational operation in the embodiment, the same effect is achieved even in the case of rearward rotational operation.

Both of the pull-down switches 507 and 508 as switching circuits and the oscillation starting circuit comprising the resistor 509 and the pull-down switch 510 are for making excellent the oscillation rise characteristic in starting the oscillation drive circuit 405. Although according to the embodiment, both of them are integrated to the oscillation drive circuit 405, the effect is achieved even with either of the switching circuits and the oscillation starting circuit. According to the embodiment, both of the switching circuits and the oscillation starting circuit are integrated and there is provided the reliable ultrasonic motor having particularly excellent oscillation rise characteristic and high response.

Further, the pull-down switches 507 and 508 as switching circuits which are also used in the previous first embodiment, achieve also an effect of restraining feed-through current by setting the input terminals of the respective power amplifiers to fixed potentials when the motor is stopped in addition to the effect of making smooth rise of oscillation. Further, oscillation of the oscillation drive circuit 405 can be stopped by bringing them into an ON state in driving the motor and accordingly, they can be utilized also as means for rapidly stopping the ultrasonic motor by instantaneously suppressing remaining oscillation of the oscillator 101 observed when the ultrasonic motor is stopped.

Sixth Embodiment

Figure 15:
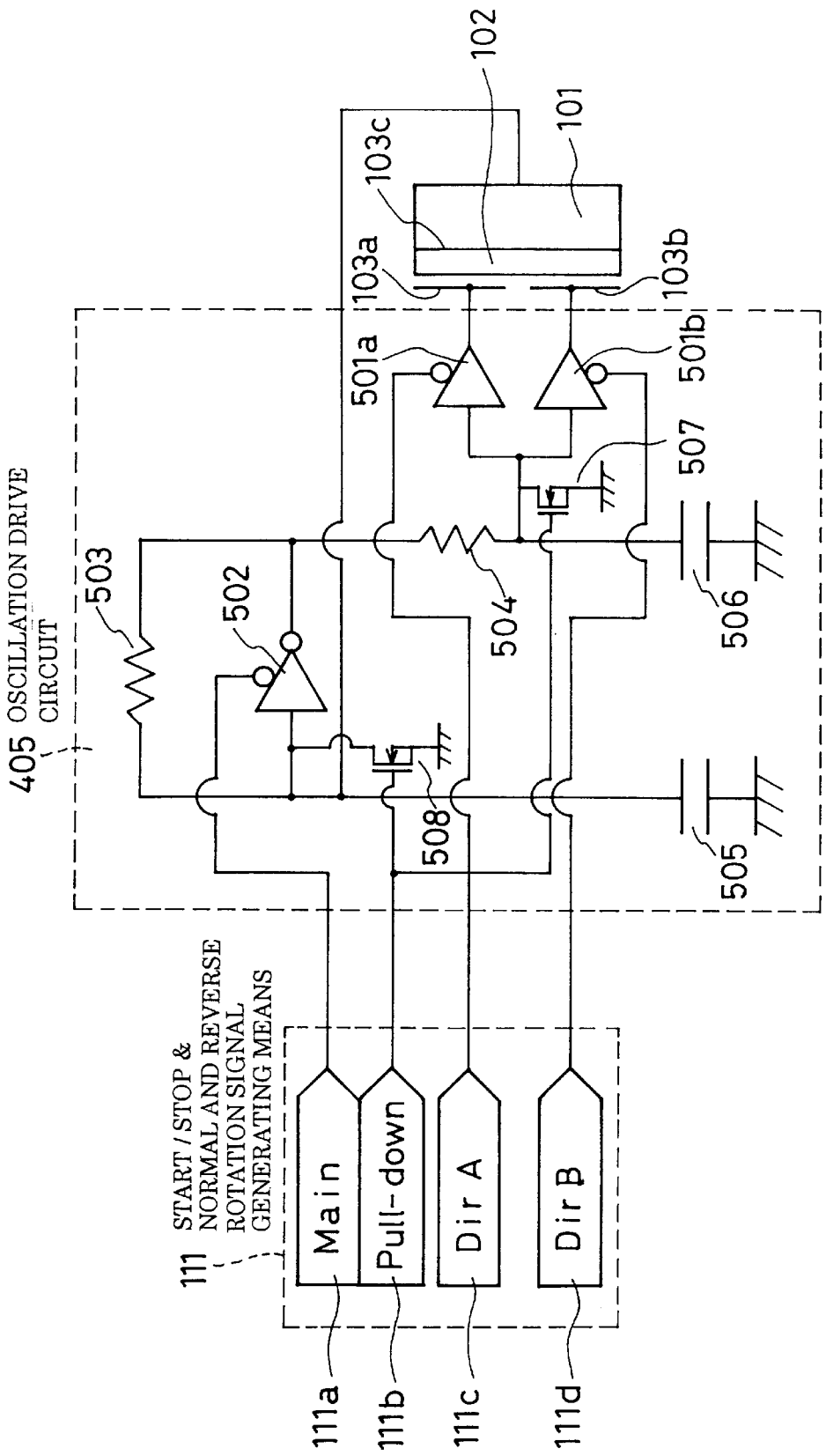
FIG. 15 is a constitution diagram of an oscillation drive circuit according to a sixth embodiment of an ultrasonic motor to which the invention is applied.

FIG. 15 is a constitution diagram of an oscillation drive circuit according to a sixth embodiment of an ultrasonic motor to which the invention is applied.

Although the embodiment is provided with a constitution substantially the same as that of the first embodiment in respect of the ultrasonic motor main body and the drive unit, the embodiment is featured in the control unit.

That is, the control unit comprises Start/stop and normal and reverse rotation signal generating means 111 as means for controlling rise of self-excited oscillation according to the invention and the Start/stop and normal and reverse rotation signal generating means is constituted by a Main signal generating unit 111a, a Pull-down signal generating unit 111b, a DirA signal generating unit 111c and DirB signal generating unit 111d for directly outputting respective High signal or Low signal to the control terminal of the 3-state inverter 502, the control terminals of the 3-state buffers 501a and 501b and control ends of the pull-down switches 507 and 508.

Next, an explanation will be given of the operation of the ultrasonic motor according to the embodiment in reference to FIG. 16, FIG. 17 and FIG. 18.

Figure 16:
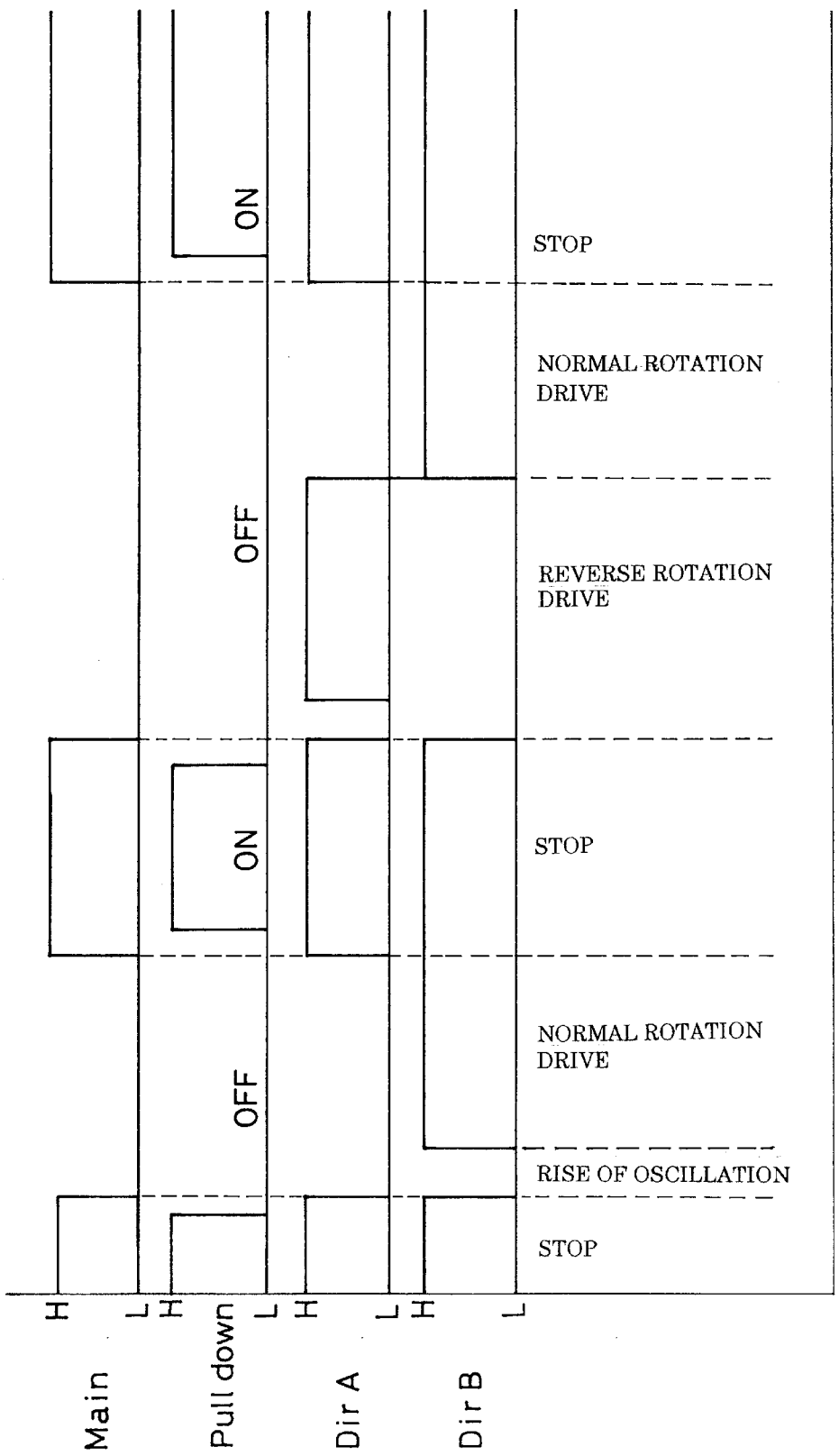
FIG. 16 is a diagram showing timing charts for switching drive/stop and rotational direction according to the sixth embodiment of the ultrasonic motor to which the invention is applied.

FIG. 16 shows a timing chart of switching drive/stop and rotational direction of the ultrasonic motor. FIG. 17 is a diagram showing admittance-frequency characteristic of the oscillator 101 bonded with the piezoelectric element 102.

Figure 18:
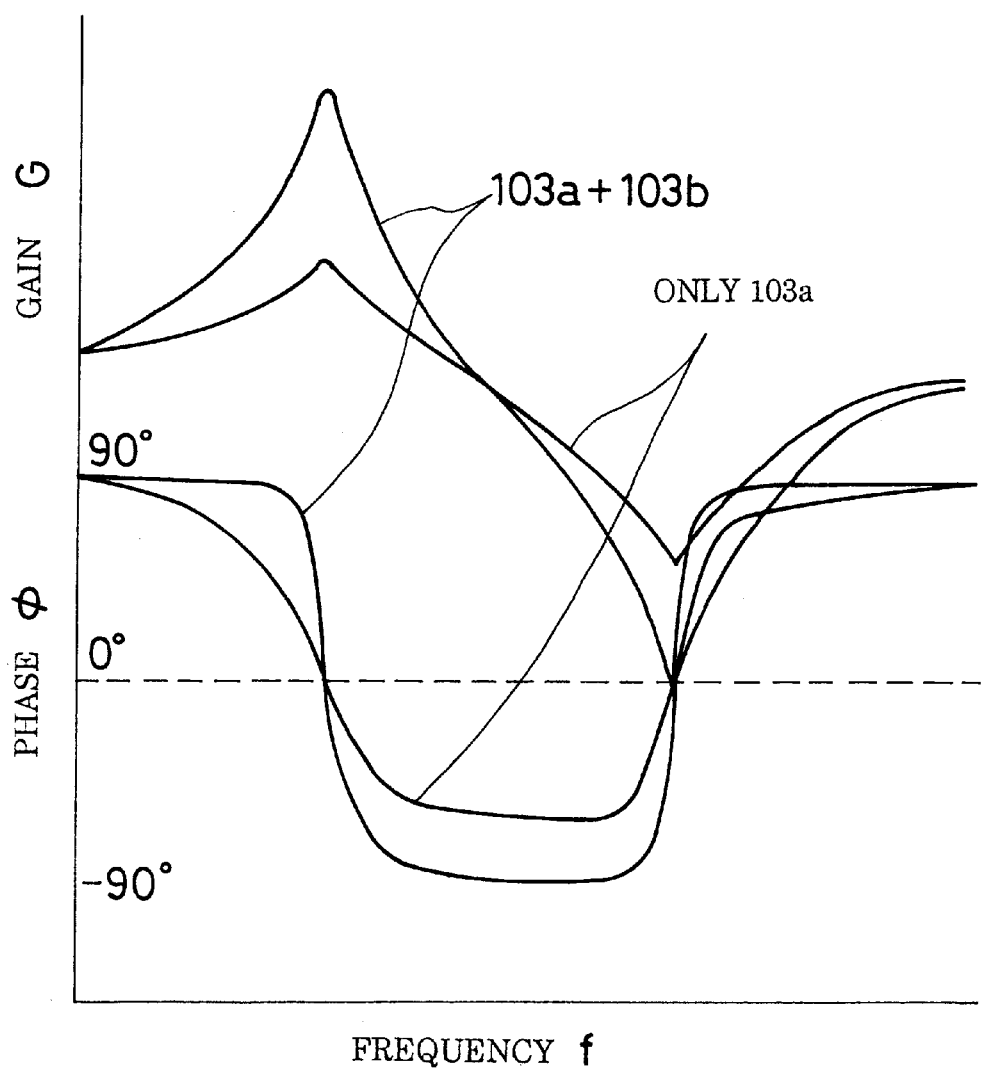
FIG. 18 is a diagram showing the loop gain and phase characteristic of an oscillation drive circuit according to the sixth embodiment of the ultrasonic motor to which the invention is applied.

FIG. 18 is a diagram showing the loop gain and phase characteristic of the oscillation drive circuit 405.

In FIG. 16, High signal is outputted from the Main signal generating unit 111a, the High signal is inverted and inputted to the control terminal of the 3-state inverter 502, makes the 3-state inverter 502 DISABLE, that is, brings the output terminal into a high impedance state.

At this occasion, High signal is outputted from the Pull-down signal generating unit 111b, the High signal is inputted to the control terminals of the pull-downs switches 507 and 508 to thereby bring the pull-down switches 507 and 508 into an ON state and discharges remaining electric charge stored in the condensers 505 and 506 to bring them into a null state. High signal is outputted from the DirA signal generating unit 111c and the High signal is inverted and inputted to the control terminal of the 3-state buffer 501a and makes the 3-state buffer 501a DISABLE. High signal is outputted from the DirB signal generating unit 111d and the High signal is inverted and inputted to the control terminal of the buffer 501b and makes the 3-state buffer 501b DISABLE.

In the case of carrying out rise of oscillation, Low signal is outputted from the Main signal generating unit 111a and the Low signal is inverted and inputted to the control terminal of the 3-state inverter 502 and makes the 3-state inverter 502 ENABLE, that is, brings it into an active state.

At this occasion, Low signal is outputted from the Pull-down signal generating unit 111b and the Low signal brings the pull-down switches 507 and 508 into an OFF state. Further, Low signals are outputted from the DirA signal generating unit 111c and the DirB signal generating unit 111d and the Low signal is inverted and inputted to the control terminals of the 3-state buffers 501a and 501b and makes both of the 3-state buffers 501a and 501b ENABLE.

In this case, signals amplified by the 3-state buffers 501a and 501b are respectively inputted to the electrode patterns 103a and 103b and excite the oscillator 101 by both of the two sets of polarizing patterns 103a and 103b of the piezoelectric element 102.

Figure 17:
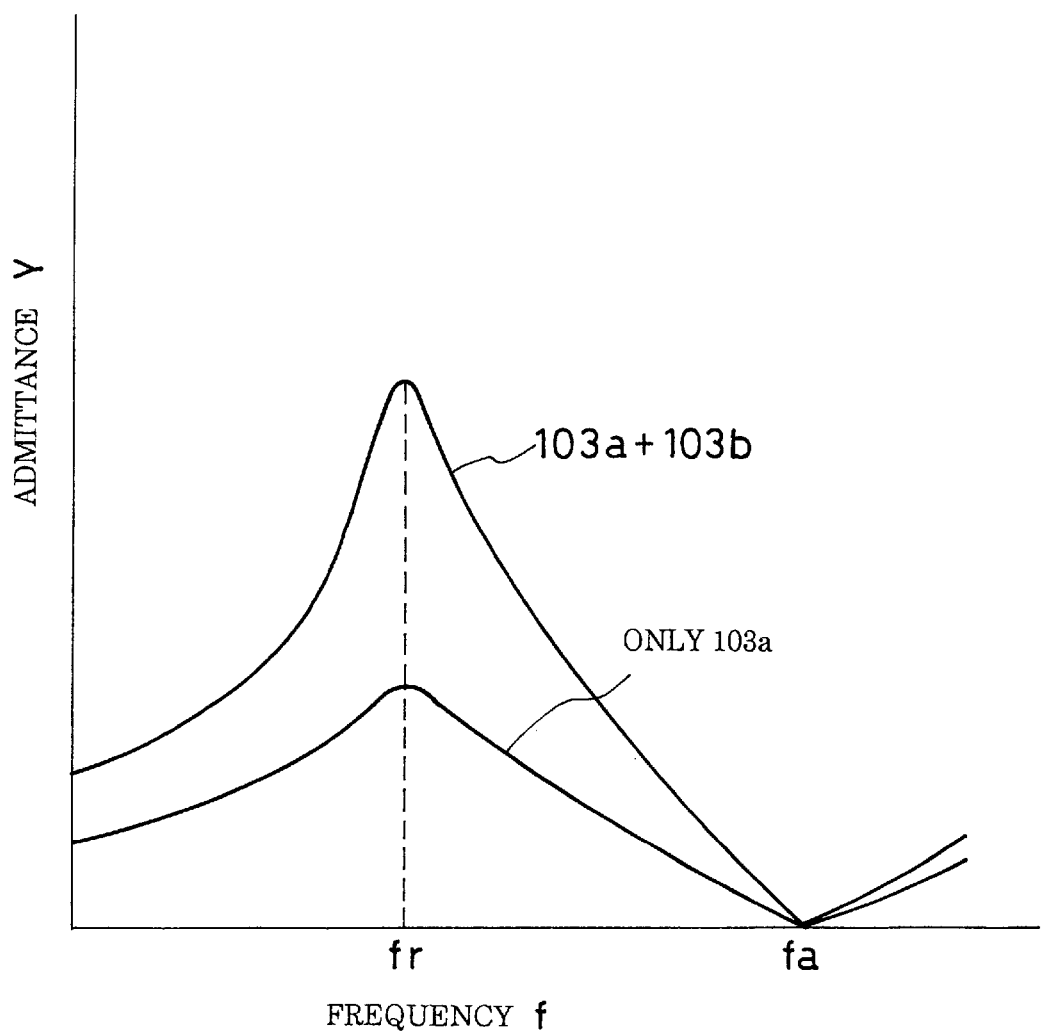
FIG. 17 is a diagram showing the admittance-frequency characteristic of an oscillator bonded with a piezoelectric element according to the sixth embodiment of the ultrasonic motor to which the invention is applied.

The reason is that as shown by FIG. 17, the resonance is sharp, stronger exciting force is provided which is operated advantageously to self-excited oscillation when both of the electrode patterns (103a and 103b) are used than when one electrode pattern (103a or 103b) is used. Further, according to the loop gain and phase characteristic of the oscillation drive circuit 405 integrated with the oscillator 101, as shown by FIG. 18, it is known that high loop gain is provided and rise of self-excited oscillation is accelerated by using both of electrode patterns 103a and 103b. Also in respect of the phase characteristic, it is known that sharper phase inversion is observed and high oscillation stability is provided. Hence, by using these characteristic, as mentioned above, rise of self-excited oscillation is carried out by using both of the electrode patterns (103a and 103b). Further, after the oscillation signal has grown and the oscillation has risen, High signal is outputted from the DirB signal generating unit 111d in the case of forward rotation drive. The High signal is inverted, the 3-state buffer 501b is made DISABLE, that is, the output terminal is brought into a high impedance state and only the 3-state buffer 501a is made ENABLE, that is, maintains an active state and the moving body 108 is rotated in the forward direction.

Meanwhile, in the case of reverse rotation drive, High signal is outputted from the DirA signal generating unit 111c and Low signal is outputted from the DirB signal generating unit 111d. The High signal is inverted and inputted to the control terminal of the 3-state buffer 501a to thereby make the 3-state buffer 501a DISABLE and the Low signal is inverted and inputted to the control terminal of the 3-state buffer 501b to thereby make the 3-state buffer 501b ENABLE and as a result, the moving body 108 is rotated in the rearward direction.

As mentioned above, according to the embodiment, signals amplified by the 3-state buffers 501a and 501b are inputted to the electrode patterns 103a and 103b in the case of rise of oscillation, that is, by using both of the electrode patterns 103a and 103b of the piezoelectric element 102, the loop gain of the oscillation drive circuit 405 is increased, further, the excitation signal is made to grow in a short period of time and accordingly, more excellent oscillation drive characteristic is shown in restarting operation.

Further, although according to the embodiment, the pull-down switches 507 and 508 as switching circuits are also used to achieve further excellent oscillation rise characteristic, there is achieved an effect of enabling rise of oscillation in a short period of time even with means of carrying out rise of oscillation by using the both electrode groups 103a and 103b of the piezoelectric element 102.

Seventh Embodiment

Figure 19:
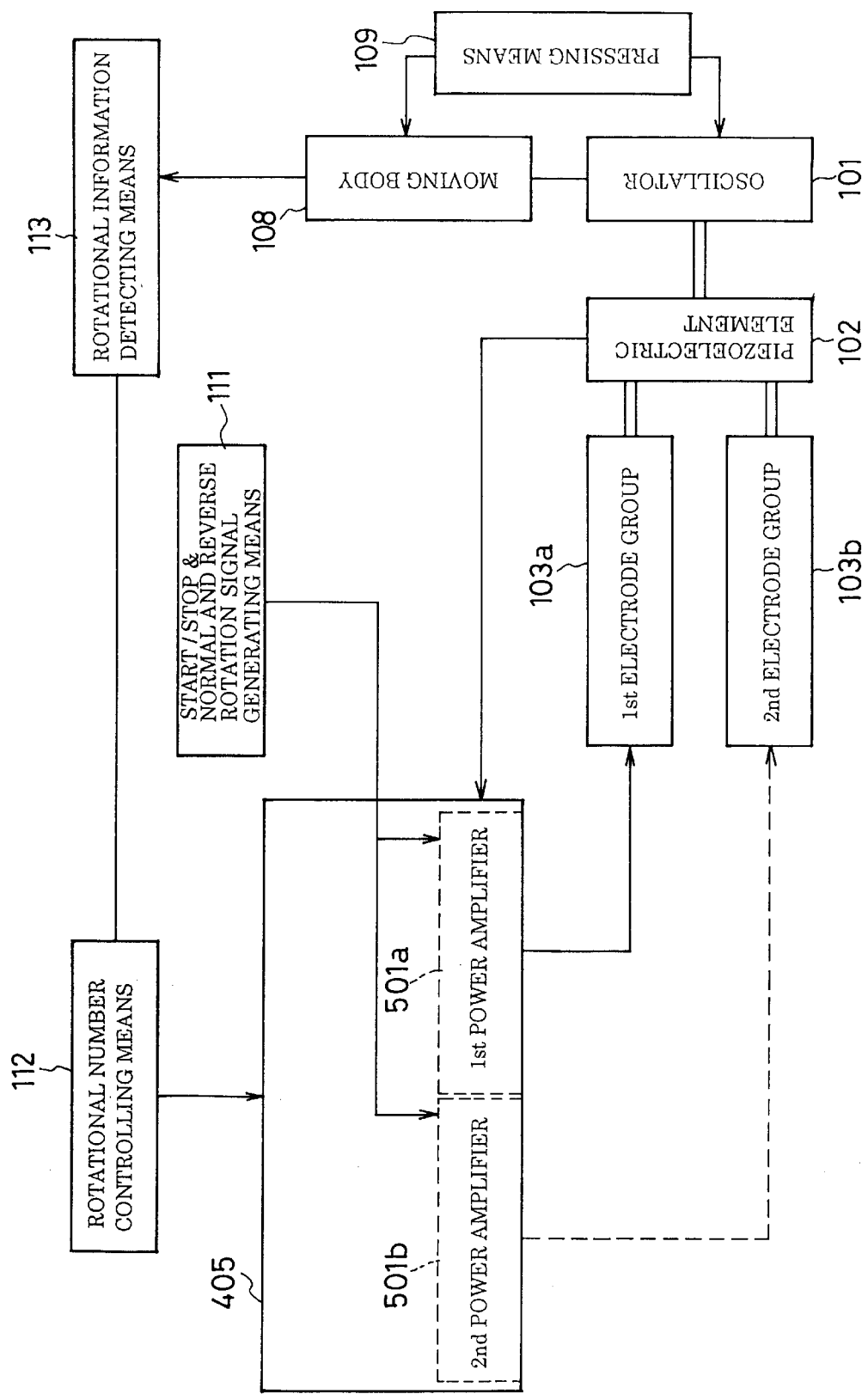
FIG. 19 is a block diagram according to a seventh embodiment of an ultrasonic motor to which the invention is applied.

FIG. 19 is a block diagram according to a seventh embodiment of an ultrasonic motor to which the invention is applied.

Figure 20:
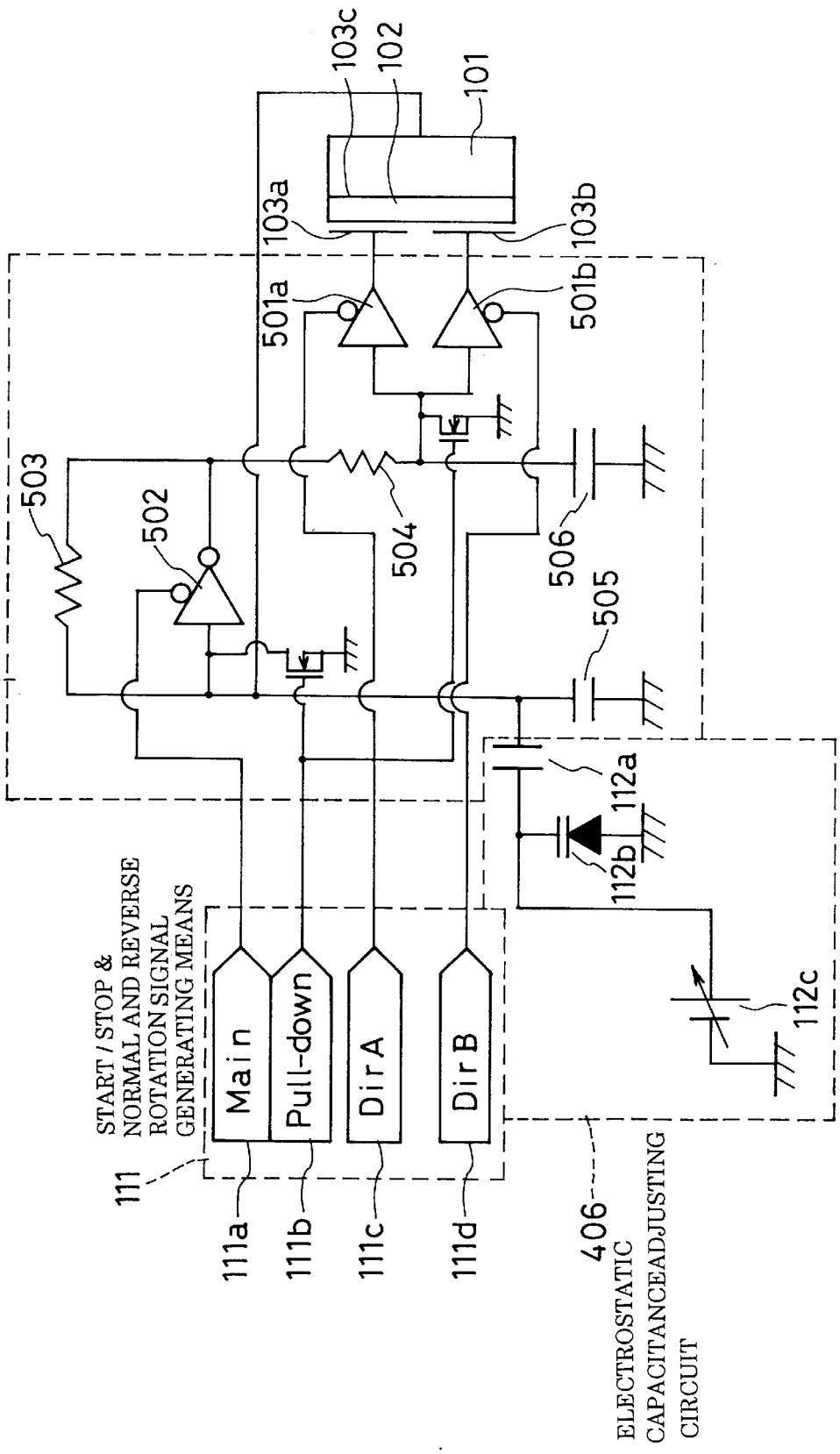
FIG. 20 is a constitution diagram of an oscillation drive circuit according to the seventh embodiment of the ultrasonic motor to which the invention is applied.

FIG. 20 is a constitution diagram of an oscillation drive circuit according to the embodiment.

Although the embodiment is provided with a constitution substantially similar to that of the sixth embodiment, the embodiment is featured in that rotational number controlling means 112 and rotational information detecting means 113 are additionally installed.

In this case, as the rotational number controlling means 112, as shown by FIG. 20, there is used an electrostatic capacity adjusting circuit 406 for adjusting an electrostatic capacity of a capacitive circuit of the oscillation drive circuit 405. The electrostatic capacity adjusting circuit 406 comprises a condenser 112a connected to the condenser 505 of the oscillation drive circuit 405, a variable capacity diode 112b one end of which is connected to the condenser 112a and other end of which is grounded and a variable power source 112c connected in parallel with the variable capacity diode 112b. Further, by changing the electrostatic capacity of the capacitive circuit of the oscillation drive circuit 405 by controlling voltage of the variable power source 112 based on information from the rotational information detecting means 113, the oscillation drive frequency is adjusted and the rotational number of the ultrasonic motor is controlled.

These controls are carried out by a microcomputer system constituted by CPU (Central Processing Unit), ROM (Read Only Memory), RAM (Random Access Memory) and so on.

ROM stores control programs and target rotational number information which is control rotational number data of the moving body 108. RAM temporarily stores control program, target rotational number information and rotational information, mentioned later, in accordance with an instruction of CPU. CPU expands the control program stored in ROM, forms control information by comparing the target rotational information with the rotational information and outputs the control information to the variable power source 112c.

Further, the rotational information detecting means 113 is, for example, an encoder for detecting marks provided to the moving body 108 which forms the rotational information by detecting the rotational number of the moving body 108 and outputs the rotational information to the rotational number controlling means 112.

Next, an explanation will be given of control operation of the embodiment.

In FIG. 19, CPU of the rotational number controlling means 112 expands the control programs stored in ROM on RAM and executes the program.

The rotational number of the moving body 108 is detected by the rotational information detecting means 113 and the rotational information is inputted to the rotational number controlling means 112 and is temporarily stored in RAM. The rotational information is compared with the target rotational number information by CPU and comparison information representing coincidence or incoincidence of the rotational information with the target rotational information is formed. When the rotational information does not coincide with the target rotational number information in the comparison information, control information for changing voltage of the variable power source 112c is formed and the control information is outputted to the variable power source 112c.

The control information changes voltage of the variable power source 112c and changes the capacity of the variable capacity diode 112b by following the change of the voltage. That is, an electrostatic capacity of a total of the condensers 505 and 506 of the oscillation drive circuit 405, the condenser 112a and the variable capacity diode of the electrostatic capacity adjusting circuit 406 is changed and the oscillation condition of the oscillation drive circuit 405 is changed.

At this occasion, the change of the oscillation condition brings about the change of oscillation frequency and as a result, the oscillation amplitude of the oscillator 101 is changed. Further, the change of the oscillation amplitude of the oscillator 101 changes an amount of displacement of the projections 107 applied to the moving body 108 and the rotational number of the moving body 108 is adjusted to the target rotational number.

As mentioned above, according to the embodiment, in addition to achieving the effects of the first embodiment and the sixth embodiment, when the rotational number of the moving body 108 and the target rotational number do not coincide with each other, the electrostatic capacity of the capacitive circuit of the oscillation drive circuit 405 is changed and the oscillation drive frequency is adjusted by which the output of the oscillator 101 is adjusted and the rotational number of the moving body 108 is maintained to control to the target rotational number.

Although in this embodiment, the constant rotational number is provided by adjusting the electrostatic capacity of the capacitive circuit of the oscillation drive circuit 405, the method of adjusting the output impedance of the power amplifier 501 used in the previous third embodiment can be used along therewith, further, voltage supplied to the 3-state inverter 502 and the 3-state buffers 501a and 501b may be adjusted.

Eighth Embodiment

Figure 21:
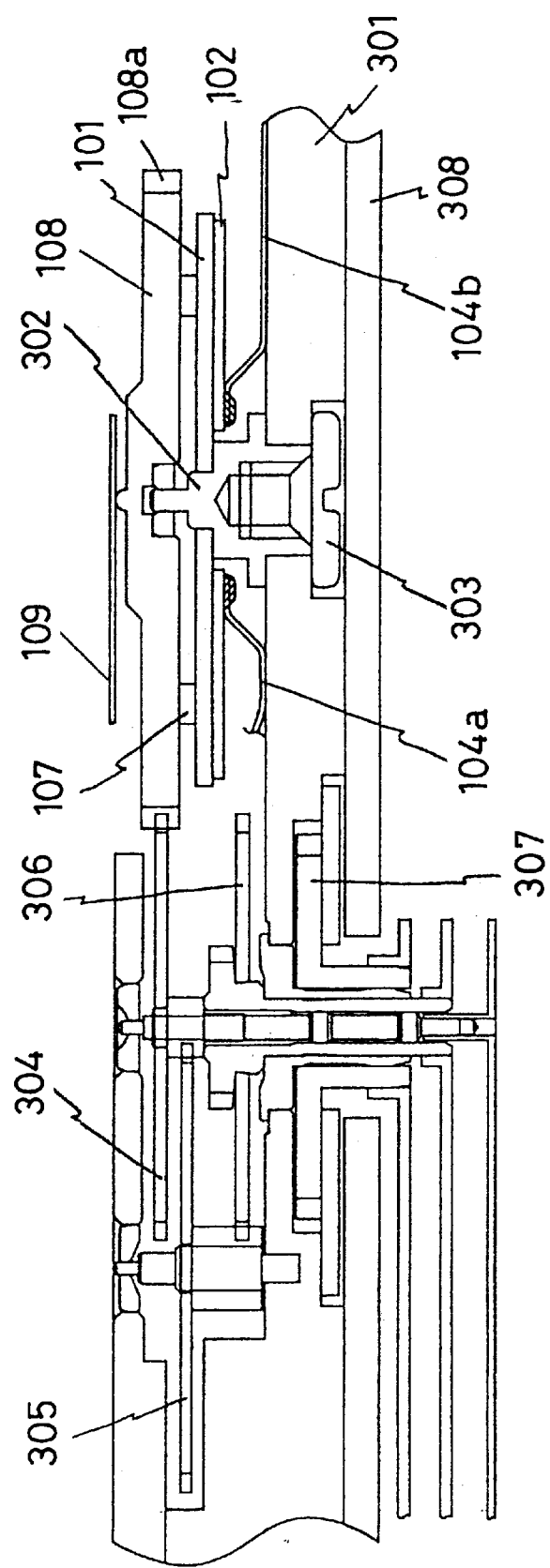
FIG. 21 is a view showing a sectional structure of an analog type timepiece having an ultrasonic motor according to an eighth embodiment to which the invention is applied.

FIG. 21 is a view showing a sectional structure of an analog type timepiece having an ultrasonic motor according to an eighth embodiment to which the invention is applied.

The analog type timepiece is constituted by the oscillator 101, the piezoelectric element 102, the projections 107, the moving body 108 and the press spring 109 mentioned above, a guide pin 302 installed at the center of the oscillator 101, a set screw 303, a base plate 301 for holding the set screw 303, a dial 308 arranged at a front face of the base plate 301, a hour hand, a minute hand and a second hand installed at a front face of the dial 308, a fourth wheel 304 in mesh with a moving body gear 108a and having a rotating shaft installed integrally with the second hand, a third wheel 305 in mesh with a rotating shaft of the fourth wheel 304, a minute wheel 306 in mesh with a rotating shaft of the third wheel 305 and installed integrally with the minute hand and a cylindrical wheel 307 in front of the minute wheel 306 and installed integrally with the hour hand.

In this case, according to the minute wheel 306 and the third wheel 305, numbers of teeth of gears are set such that the rotational speed of the minute hand becomes $1/60$ of the rotational speed of the fourth wheel 304, that is, the second hand and according to the cylindrical wheel 307 and a rear wheel (not illustrated), gear ratios are set such that the rotational speed of the hour hand becomes $1/720$ of that of the fourth wheel 304.

Next, an explanation will be given of the operation of the analog type timepiece in reference to FIG. 21.

When the moving body 108 is rotated, the moving body gear 108 rotates the fourth wheel 304 at a predetermined rotational speed and the second hand integral with the fourth wheel 304 is rotated to follow the rotation to thereby display second.

The rotational speed of the fourth wheel 304 is reduced by the third wheel 305 and the minute wheel 306. The minute hand integral with the minute wheel 306 is rotated to follow the rotation at the rotational speed of $1/60$ of that of the second hand to thereby display minute.

Meanwhile, the rotational speed of the fourth wheel 304 is reduced by the rear wheel (not illustrated) and the cylindrical wheel 307. The hour hand 32 integral with the cylindrical wheel 307 is rotated to follow the rotation at the rotational speed of $1/720$ of that of the second hand 34 to thereby display hour.

By the above-described constitution, according to the embodiment, there is realized the analog type timepiece using the ultrasonic motor.

Further, display of time information may be carried out by directly attaching an indicator or marks in the axial direction of the moving body 108 other than by a plurality of wheel trains and indicators as mentioned above and these can be observed from the side of the dial 308 and the side of the press spring 109 as well.

Further, the second hand may be moved stepwisely at every second or continuously moved by adjusting the frequency of the excitation signal inputted from the oscillation drive circuit to the piezoelectric element 102 by a motor control circuit. Further, other than time display, there may be carried out display of calendar display, a remaining amount of a battery, environmental information, a mechanism and so on.

Ninth Embodiment

Figure 22:
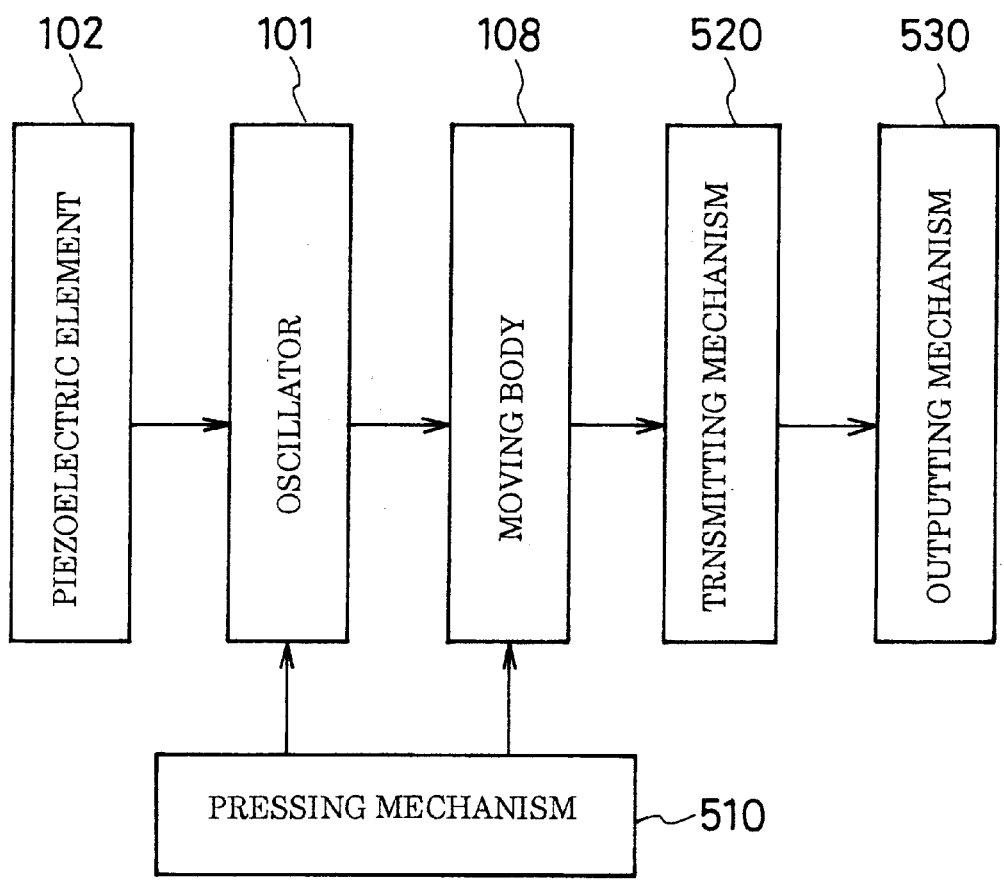
FIG. 22 is a block diagram of a ninth embodiment in which an ultrasonic motor according to the invention is applied to an electronic apparatus.
Figure 23:
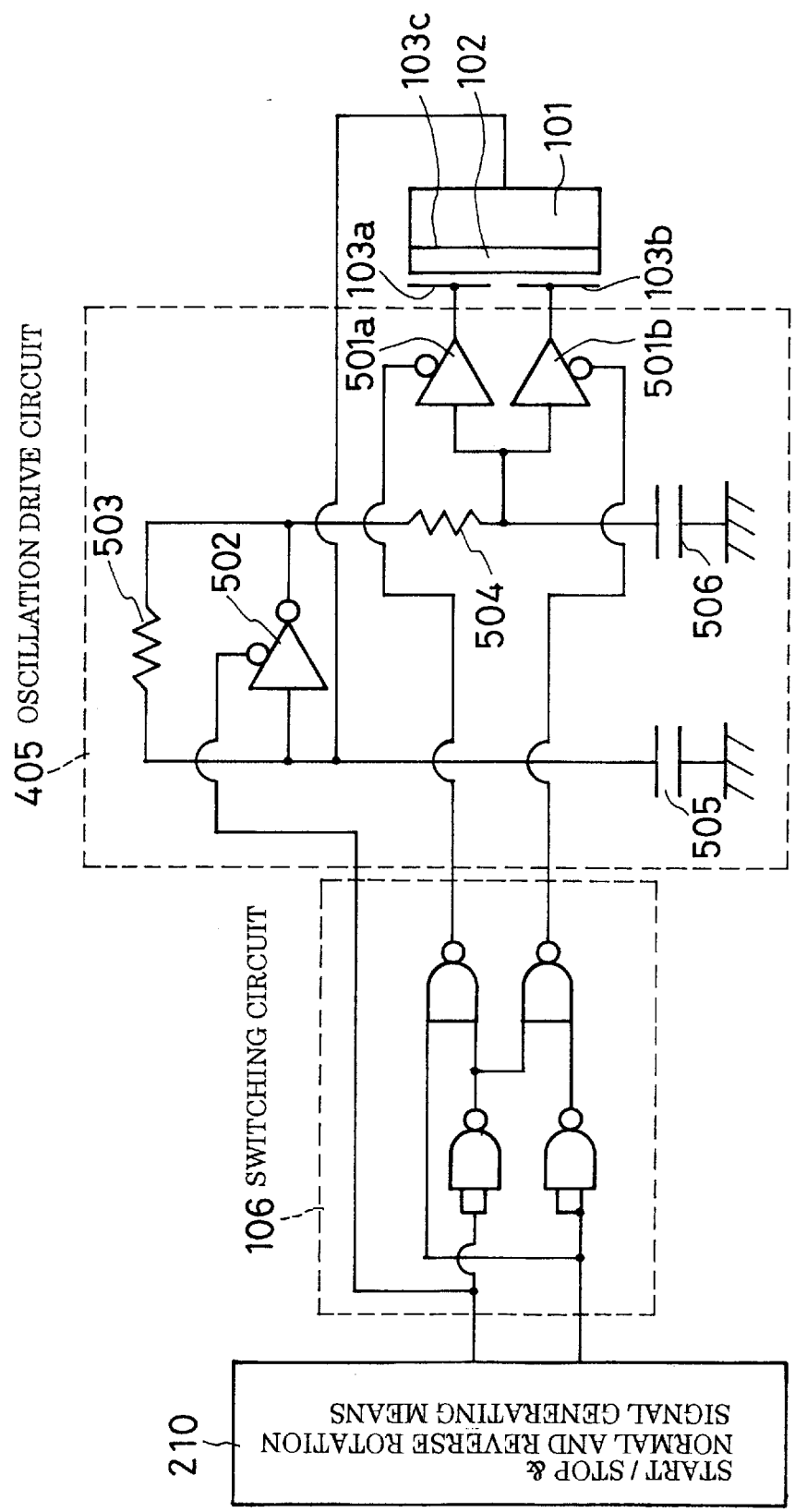
FIG. 23 is a diagram showing a circuit of an ultrasonic motor according to a conventional technology.

FIG. 22 shows a block diagram of a ninth embodiment in which an ultrasonic motor according to the invention is applied to an electronic apparatus.

The electronic apparatus is realized by comprising the oscillator 101, the piezoelectric element 102 and the moving body 108, mentioned above, a pressing mechanism 510 for pressing the moving body 108 and the oscillator 108, a transmitting mechanism 520 capable of moving integrally with the moving body 101 and an output mechanism 530 operated based on the operation of the transmitting mechanism 520.

In this case, as the electronic apparatus according to the invention, there can be realized, for example, an electronic timepiece, a measuring instrument, a camera, a printer, a printing machine, a machine tool, a robot, a moving apparatus or the like.

Transmitting wheels of, for example, gears, friction wheels and so on are used in the transmitting mechanism 520.

As the output mechanism 530, there is used, for example, a shutter drive mechanism or a lens drive mechanism in a camera, an indicator drive mechanism or a calendar drive mechanism in an electronic timepiece, a tool feed mechanism, a work feed mechanism or the like in a machine tool.

Further, a drive mechanism of an ultrasonic motor can be realized by constructing a constitution in which an output shaft is attached to a moving body and which is provided with a power transmitting mechanism for transmitting torque from the output shaft.

As mentioned above, according to the invention described in claim 1, by providing the switching circuit for shortcircuiting the terminals of the capacitive element, the initial signal constituting the basis of self-excited oscillation is facilitated to generate in the oscillation drive circuit and is amplified to the excitation signal in a short period of time with the smaller number of times of amplification and accordingly, excellent response is shown also in restarting operation.

Further, according to the invention described in claim 2, by installing the oscillation starting circuit for generating the oscillation start trigger during the rise time period for starting oscillation, failure of starting oscillation can be avoided even with a dispersion in semiconductor process, oscillation can be risen in a short period of time and accordingly, excellent response is provided.

Further, according to the invention described in claim 3, the switching circuit for shortcircuiting the terminals of the capacitive element and the oscillation starting circuit for generating the oscillation start trigger in the rise time period of starting oscillation are installed and accordingly, excellent response and high reliability are achieved.

Further, according to the invention described in claim 4, the inverter is used at an input unit of the power amplifier of the oscillation drive circuit and accordingly, the rise time period of oscillation is shortened even with a dispersion in semiconductor process and high response is shown.

Further, according to the invention described in claim 5, the inverter is used at the input unit of the power amplifier of the oscillation drive circuit and the switching circuit for shortcircuiting the terminals of the capacitive element is installed and accordingly, excellent response and high reliability are achieved.

Further, according to the invention described in claim 6, the inverter is installed at the input unit of the power amplifier of the oscillation drive circuit, the prebuffer is installed between the inverter at the input unit and the output unit, the inversion voltages of the inverter at the input unit and the prebuffer are made a half of the power source voltage and accordingly, further excellent oscillation rise characteristic is achieved.

Further, according to the invention described in claim 7, there are arranged the two power amplifiers for driving to excite respectively the two sets of the electrode groups formed on the surface of the piezoelectric element independently from each other and the rotational direction is switched by selecting to use the power amplifiers and accordingly, oscillation rise characteristic which is easy to oscillate and excellent is achieved.

Further, according to the invention described in claim 8, the two power amplifiers for driving to excite respectively the two sets of electrode groups formed on the surface of the piezoelectric element independently from each other, are constituted by pluralities of power amplifying circuits respectively connected in parallel with each other by which the output impedances of the respective power amplifiers can be adjusted and accordingly, there is provided an ultrasonic motor having high function against a change in load or outer environment.

Further, according to the invention described in claim 9, the voltage detecting means for detecting the power source voltage and the voltage comparing means for comparing the power source voltage with the previously set power source data are installed and the output impedance of the power amplifier is adjusted by a result of the voltage comparing means and accordingly, there is provided the ultrasonic motor of a self-excited drive type with high reliability capable of dealing with the change in the power source voltage or the like.

Further, according to the invention described in claim 10, there is constructed a constitution in which only transistors at output stages are connected in parallel with each other in respect of the plurality of power amplifying circuits connected in parallel with each other constituting the power amplifier and the output impedance of the power amplifier is adjusted by cutting the connection on the drain sides of the transistors at the output stages and accordingly, adjustment of the output impedance is facilitated when drive environment or drive conditions or the like are changed and the oscillation drive circuit can further be simplified.

Further, according to the invention described in claim 11, there is installed the self-excited oscillation rise means arranged with the two power amplifiers for driving to excite respectively the two sets of electrodes formed on the surface of the piezoelectric element independently from each other, carries out oscillation rise by using both of the power amplifiers in rise of oscillation and starts to drive a motor by bringing one of the power amplifiers into a stop state after the initial signal has been amplified to the excitation signal and accordingly, the oscillation rise time period is significantly shortened and high response and high reliability are achieved.

Further, according to the invention described in claim 12, there is constituted the oscillation drive circuit by the oscillator and the capacitive element by utilizing the inductive performance provided to the oscillator bonded with the piezoelectric element in the mechanical resonance state and accordingly, the mechanical resonance of the oscillator is sharp by which there is provided the drive circuit with stability excellent in the performance of selecting frequency.

Further, according to the invention described in claim 13, the electrodes of substantially a multiple of 4 are formed at least on one surface, contiguous two of the electrodes are paired and subjected to the polarization treatment alternately reversing the direction at every set, the two sets of electrode groups are constituted by electrically shortcircuiting every other electrode by the first connecting means and the second connecting means and the projections are installed at positions of vicinities of every other boundary of the electrodes on one surface of the oscillator and accordingly, there is provided the ultrasonic motor of the single layer drive capable of switching the rotational direction by selecting the two sets of the electrode groups and the oscillation drive circuit is constructed by a very simple constitution.

Further, according to the invention described in claim 14, there are installed the rotational information detecting means and the rotational number controlling means for changing the electrostatic capacitance of the capacitive circuit of the oscillation drive rotation and accordingly, high drive stability against drive environment or load variation or the like is achieved.

Further, according to the invention described in claim 15, the ultrasonic motor according to any one of claim 1 through claim 14 is mounted to the electronic apparatus having the ultrasonic motor and accordingly, function and reliability of the electronic apparatus having the ultrasonic motor are promoted.

What is claimed is:

1. An ultrasonic motor comprising:

a piezoelectric element;

an oscillator bonded to the piezoelectric element for frictionally driving a moving body by means of an oscillation wave generated in the oscillator in response to elongation and contraction movement of the piezoelectric element;

an oscillation drive circuit for generating the oscillation wave by self-excited oscillation of the oscillator; and start/stop signal generating means for generating an output signal for controlling the starting and stopping of the ultrasonic motor by bringing the oscillation drive circuit into an active state and a stop state, respectively;

wherein the oscillation drive circuit comprises a power amplifier for amplifying an excitation signal, a capacitive circuit for adjusting a frequency of the oscillation signal, and a switching circuit connected in parallel with a capacitive element of the capacitive circuit for short-circuiting terminals of the capacitive element based on the output signal from the start/stop signal generating means; and wherein when the oscillation drive circuit is brought into the stop state based on the output signal from the start/stop signal generating means, the switching circuit is turned ON and the terminals of the capacitive element are thereby brought into a short-circuited state to discharge the capacitive element during the stop state.

2. An ultrasonic motor comprising:

a piezoelectric element;

an oscillator bonded to the piezoelectric element for frictionally driving a moving body by means of an oscillation wave generated in the oscillator in response to elongation and contraction movement of the piezoelectric element;

an oscillation drive circuit for generating the oscillation wave by self-excited oscillation of the oscillator; and start/stop signal generating means for generating an output signal for controlling the start/stop state of the ultrasonic motor by bringing the oscillation drive circuit into an active state or a stop state;

wherein the oscillation drive circuit comprises a power amplifier for amplifying an excitation signal, a capacitive circuit for adjusting a frequency of the excitation signal, and an oscillation starting circuit for generating an oscillation start trigger signal based on the output signal from the start/stop signal generating means; and wherein the oscillation starting circuit for generating the oscillation start trigger signal is operated to generate the oscillation start trigger signal during a rise time period in which the oscillation drive circuit is brought into an active state and starts oscillation based on the output signal from the start/stop signal generating means.

3. An ultrasonic motor comprising:

a piezoelectric element;

an oscillator bonded to the piezoelectric element for frictionally driving a moving body by means of an oscillation wave generated in the oscillator in response to elongation and contraction movement of the piezoelectric element;

an oscillation drive circuit for generating the oscillation wave by self-excited oscillation of the oscillator; and start/stop signal generating means for generating an output signal for controlling the starting and stopping of the ultrasonic motor by bringing the oscillation drive circuit into an active state and a stop state, respectively;

wherein the oscillation drive circuit comprises a power amplifier for amplifying an excitation signal, a capacitive circuit for adjusting a frequency of the excitation signal, a switching circuit connected in parallel with a capacitive element of the capacitive circuit for short-circuiting terminals of the capacitive element based on the output signal from the start/stop signal generating means, and an oscillation starting circuit for generating an oscillation start trigger signal based on the output signal from the start/stop signal generating means;

wherein when the oscillation drive circuit is brought into a stop state based on the output signal from the start/stop signal generating means, the switching circuit is turned ON and the terminals of the capacitive element are thereby brought into a short-circuited state to discharge the capacitive element during the stop state; and wherein when the oscillation drive circuit is brought into an active state based on the output signal from the start/stop signal generating means, the switching circuit is turned OFF and the oscillation starting circuit for generating the oscillation start trigger signal is operated to generate the oscillation start trigger signal during a rise time period of the start of oscillation.

4. An ultrasonic motor comprising:

a piezoelectric element;

an oscillator bonded to the piezoelectric element for frictionally driving a moving body by means of an oscillation wave generated in the oscillator in response to elongation and contraction movement of the piezoelectric element;

an oscillation drive circuit for generating the oscillation wave by self-excited oscillation of the oscillator; and start/stop signal generating means for generating an output signal for controlling the starting and stopping of the ultrasonic motor by bringing the oscillation drive circuit into an active state and a stop state, respectively;

wherein the oscillation drive circuit comprises a power amplifier having switching elements for amplifying an excitation signal, and a capacitive circuit for adjusting a frequency of the oscillation signal; and wherein the power amplifier of the oscillation drive circuit has an input unit comprising an inverter to provide an output to the switching elements of the power amplifier to compensate for dispersion in switching characteristics of the switching elements so that the switching elements operate at the same phase.

5. An ultrasonic motor comprising:

a piezoelectric element;

an oscillator bonded to the piezoelectric element for frictionally driving a moving body by means of an oscillation wave generated in the oscillator in response to elongation and contraction movement of the piezoelectric element;

an oscillation drive circuit for generating the oscillation wave by self-excited oscillation of the oscillator; and start/stop signal generating means for generating an output signal for controlling the starting and stopping of the ultrasonic motor by bringing the oscillation drive circuit into an active state and a stop state, respectively;

wherein the oscillation drive circuit comprises a power amplifier for amplifying an excitation signal and having an input unit comprising an inverter, a capacitive circuit for adjusting a frequency of the excitation signal and a switching circuit connected in parallel with a capacitive element of the capacitive circuit for short-circuiting terminals of the capacitive element based on the output signal from the start/stop signal generating means; and wherein when the oscillation drive circuit is brought into a stop state based on the output signal from the start/stop signal generating means, the switching circuit is turned ON and the terminals of the capacitive element are thereby brought into a short-circuited state to discharge the capacitive element during the stop state.

6. The ultrasonic motor according to claim 4 or claim 5; wherein the power amplifier of the oscillation drive circuit comprises the inverter of the input unit, and a prebuffer installed between the inverter of the input unit and an output unit; and wherein inversion voltages of the inverter of the input unit and the prebuffer are equal to one-half of a power source voltage.

7. The ultrasonic motor according to claim 1; further comprising two sets of electrode groups comprising a plurality of electrodes formed on a surface of the piezoelectric element; wherein the power amplifier of the oscillation drive circuit comprises two power amplifiers having output terminals which are connected respectively to the two sets of electrode groups formed on the surface of the piezoelectric element for driving the respective electrode groups independently from each other, only one of the two power amplifiers being activated at a given time; and wherein a rotational direction of the moving body is switched by switching the one of the two power amplifiers which is placed in an active state based on the output signal from the start/stop signal generating means.

8. The ultrasonic motor according to claim 7; wherein the two power amplifiers comprise a plurality of power amplifying circuits connected in parallel with each other; and further comprising output adjusting signal generating means for outputting a signal for adjusting an output impedance of the power amplifier by selecting which of the plurality of power amplifying circuits is to be activated.

9. The ultrasonic motor according to claim 8; further comprising voltage detecting means for detecting a power source voltage of a power source; and voltage comparing means for comparing the voltage detected by the voltage detecting means with predetermined power source voltage data; and wherein the output adjusting signal adjusting means includes means for adjusting the output impedance of the power amplifier when the voltage detected by the voltage detecting means and the power source voltage data do not coincide with each other as a result of comparison by the voltage comparing means.

10. The ultrasonic motor according to claim 9; wherein the output impedance of the power amplifier is adjusted by cutting a connection at a drain side of output stage transistors of the power amplifier of the oscillation drive circuit based on an output signal from one of the start/stop signal generating means and the output adjusting signal generating means.

11. An ultrasonic motor comprising:

a piezoelectric element;

an oscillator bonded to the piezoelectric element for frictionally driving a moving body by means of an oscillation wave generated in the oscillator in response to elongation and contraction movement of the piezoelectric element;

an oscillation drive circuit for generating an oscillation wave by self-excited oscillation of the oscillator; and start/stop signal generating means for generating an output signal for controlling the starting and stopping of the ultrasonic motor by bringing the oscillation drive circuit into an active state and a stop state, respectively;

wherein two sets of electrode groups comprising a plurality of electrodes are formed on a surface of the piezoelectric element;

wherein the oscillation drive circuit comprises two power amplifiers having output terminals which are connected respectively to the two sets of electrode groups formed on the surface of the piezoelectric element to excite the respective electrode groups independently from each other, and a capacitive circuit for adjusting a frequency of an excitation signal;

wherein a rotational direction of the moving body is switched by selecting which of the two power amplifiers is placed in an active state;

and wherein the ultrasonic motor further comprises self-excited oscillation rise controlling means for forming an initial signal in the oscillation drive circuit by bringing both of the two power amplifiers into the active state when the ultrasonic motor is started and bringing only one of the power amplifiers into a stop state and starting a driving operation in accordance with the output signal from the start/stop signal generating means after the initial signal has been amplified to the excitation signal by the oscillation drive circuit.

12. The ultrasonic motor according to claim 1; wherein the oscillation drive circuit further comprises a resonating circuit formed by the oscillator and the capacitive element by utilizing an inductive property provided to the oscillator in a mechanical resonance state.

13. The ultrasonic motor according to claim 1; wherein the piezoelectric element is formed with a multiple of 4 electrodes disposed substantially at equal intervals on at least one surface thereof and subjected to a polarization treatment in which each two contiguous electrodes are paired and a direction of the polarization treatment is reversed at each respective pair, and further comprising first connecting means and second connecting means for connecting the electrodes into two sets of electrode groups by electrically shortcircuiting every other electrode, and a plurality of projections formed on the oscillator for transmitting power to the moving body, the projections being formed at positions in the vicinity of every other boundary of the plural electrodes.

14. The ultrasonic motor according to claim 1; further comprising rotational information detecting means for detecting a rotational state of the moving body, and rotational rate controlling means for adjusting a rotational rate of the moving body based on an output signal from the rotational information detecting means; and wherein the rotational rate controlling means comprises an electrostatic capacity adjusting circuit for changing an electrostatic capacity of the capacitive circuit of the oscillation drive circuit.

15. An electronic apparatus having an ultrasonic motor comprising the ultrasonic motor according to claim 1.

16. The ultrasonic motor according to claim 2; further comprising two sets of electrode groups comprising a plurality of electrodes formed on a surface of the piezoelectric element; wherein the power amplifier of the oscillation drive circuit comprises two power amplifiers having output terminals which are connected respectively to the two sets of electrode groups formed on the surface of the piezoelectric element for driving the respective electrode groups independently from each other; and wherein a rotational direction of the moving body is switched by switching the one of the two power amplifiers placed in an active state based on the output signal from the start/stop signal generating means.

17. The ultrasonic motor according to claim 16: wherein the two power amplifiers comprise a plurality of power amplifying circuits connected in parallel with each other; and further comprising output adjusting signal generating means for outputting a signal for adjusting an output impedance of the power amplifier by selecting which of the plurality of power amplifying circuits is to be activated.

18. The ultrasonic motor according to claim 17; further comprising voltage detecting means for detecting a power source voltage of a power source; and voltage comparing means for comparing the voltage detected by the voltage detecting means with predetermined power source voltage data; and wherein the output adjusting signal adjusting means includes means for adjusting the output impedance of the power amplifier when the voltage detected by the voltage detecting means and the power source voltage data do not coincide with each other as a result of comparison by the voltage comparing means.

19. The ultrasonic motor according to claim 18; wherein the output impedance of the power amplifier is adjusted by cutting a connection of drain sides of output stage transistors of the power amplifier of the oscillation drive circuit based on the output signal from the start/stop signal generating means or the output adjusting signal generating means.

20. The ultrasonic motor according to claim 3; further comprising two sets of electrode groups comprising a plurality of electrodes formed on a surface of the piezoelectric element; wherein the power amplifier of the oscillation drive circuit comprises two power amplifiers having output terminals which are connected respectively to the two sets of electrode groups formed on the surface of the piezoelectric element for driving the respective electrode groups independently from each other; and wherein a rotational direction of the moving body is switched by switching the one of the two power amplifiers placed in an active state based on the output signal from the start/stop signal generating means.

21. The ultrasonic motor according to claim 20: wherein the two power amplifiers comprise a plurality of power amplifying circuits connected in parallel with each other; and further comprising output adjusting signal generating means for outputting a signal for adjusting an output impedance of the power amplifier by selecting which of the plurality of power amplifying circuits is to be activated.

22. The ultrasonic motor according to claim 21; further comprising voltage detecting means for detecting a power source voltage of a power source; and voltage comparing means for comparing the voltage detected by the voltage detecting means with predetermined power source voltage data; and wherein the output adjusting signal adjusting means includes means for adjusting the output impedance of the power amplifier when the voltage detected by the voltage detecting means and the power source voltage data do not coincide with each other as a result of comparison by the voltage comparing means.

23. The ultrasonic motor according to claim 22; wherein the output impedance of the power amplifier is adjusted by cutting a connection of drain sides of output stage transistors of the power amplifier of the oscillation drive circuit based on the output signal from the start/stop signal generating means or the output adjusting signal generating means.

24. The ultrasonic motor according to claim 4; further comprising two sets of electrode groups comprising a plurality of electrodes formed on a surface of the piezoelectric element; wherein the power amplifier of the oscillation drive circuit comprises two power amplifiers having output terminals which are connected respectively to the two sets of electrode groups formed on the surface of the piezoelectric element for driving the respective electrode groups independently from each other; and wherein a rotational direction of the moving body is switched by switching the one of the two power amplifiers placed in an active state based on the output signal from the start/stop signal generating means.

25. The ultrasonic motor according to claim 24: wherein the two power amplifiers comprise a plurality of power amplifying circuits connected in parallel with each other; and further comprising output adjusting signal generating means for outputting a signal for adjusting an output impedance of the power amplifier by selecting which of the plurality of power amplifying circuits is to be activated.

26. The ultrasonic motor according to claim 25; further comprising voltage detecting means for detecting a power source voltage of a power source; and voltage comparing means for comparing the voltage detected by the voltage detecting means with predetermined power source voltage data; and wherein the output adjusting signal adjusting means includes means for adjusting the output impedance of the power amplifier when the voltage detected by the voltage detecting means and the power source voltage data do not coincide with each other as a result of comparison by the voltage comparing means.

27. The ultrasonic motor according to claim 26; wherein the output impedance of the power amplifier is adjusted by cutting a connection of drain sides of output stage transistors of the power amplifier of the oscillation drive circuit based on the output signal from the start/stop signal generating means or the output adjusting signal generating means.

28. The ultrasonic motor according to claim 5; further comprising two sets of electrode groups comprising a plurality of electrodes formed on a surface of the piezoelectric element; wherein the power amplifier of the oscillation drive circuit comprises two power amplifiers having output terminals which are connected respectively to the two sets of electrode groups formed on the surface of the piezoelectric element for driving the respective electrode groups independently from each other; and wherein a rotational direction of the moving body is switched by switching the one of the two power amplifiers placed in an active state based on the output signal from the start/stop signal generating means.

29. The ultrasonic motor according to claim 28: wherein the two power amplifiers comprise a plurality of power amplifying circuits connected in parallel with each other; and further comprising output adjusting signal generating means for outputting a signal for adjusting an output impedance of the power amplifier by selecting which of the plurality of power amplifying circuits is to be activated.

30. The ultrasonic motor according to claim 29; further comprising voltage detecting means for detecting a power source voltage of a power source; and voltage comparing means for comparing the voltage detected by the voltage detecting means with predetermined power source voltage data; and wherein the output adjusting signal adjusting means includes means for adjusting the output impedance of the power amplifier when the voltage detected by the voltage detecting means and the power source voltage data do not coincide with each other as a result of comparison by the voltage comparing means.

31. The ultrasonic motor according to claim 30; wherein the output impedance of the power amplifier is adjusted by cutting a connection of drain sides of output stage transistors of the power amplifier of the oscillation drive circuit based on the output signal from the start/stop signal generating means or the output adjusting signal generating means.

32. The ultrasonic motor according to claim 6; further comprising two sets of electrode groups comprising a plurality of electrodes formed on a surface of the piezoelectric element; wherein the power amplifier of the oscillation drive circuit comprises two power amplifiers having output terminals which are connected respectively to the two sets of electrode groups formed on the surface of the piezoelectric element for driving the respective electrode groups independently from each other; and wherein a rotational direction of the moving body is switched by switching the one of the two power amplifiers placed in an active state based on the output signal from the start/stop signal generating means.

33. The ultrasonic motor according to claim 32: wherein the two power amplifiers each comprise a plurality of power amplifying circuits connected in parallel with each other; and further comprising output adjusting signal generating means for outputting a signal for adjusting an output impedance of the power amplifier by selecting which of the plurality of power amplifying circuits is to be activated.

34. The ultrasonic motor according to claim 33; further comprising voltage detecting means for detecting a power source voltage of a power source; and voltage comparing means for comparing the voltage detected by the voltage detecting means with predetermined power source voltage data; and wherein the output adjusting signal adjusting means includes means for adjusting the output impedance of the power amplifier when the voltage detected by the voltage detecting means and the power source voltage data do not coincide with each other as a result of comparison by the voltage comparing means.

35. The ultrasonic motor according to claim 34; wherein the output impedance of the power amplifier is adjusted by cutting a connection of drain sides of output stage transistors of the power amplifier of the oscillation drive circuit based on the output signal from the start/stop signal generating means or the output adjusting signal generating means.

36. An ultrasonic motor comprising:
a piezoelectric element;
two sets of electrode groups comprising a plurality of electrodes formed on a surface of the piezoelectric element;
an oscillator bonded to the piezoelectric element for frictionally driving a moving body by means of an oscillation wave generated in the oscillator in response to elongation and contraction movement of the piezoelectric element;
an oscillation drive circuit for generating the oscillation wave by self-excited oscillation of the oscillator, the oscillation drive circuit comprising a plurality of power amplifiers connected in parallel with each other and having an input unit comprising an inverter for amplifying an excitation signal, each power amplifier having output terminals which are connected respectively to the two sets of electrode groups formed on the surface of the piezoelectric element for driving the respective electrode groups independently from each other, and a capacitive circuit for adjusting a frequency of the oscillation signal;
output adjusting signal generating means for outputting a signal for adjusting an output impedance of the oscillation drive circuit by selecting which of the plurality of power amplifiers is to be activated;
start/stop signal generating means for generating an output signal for controlling the starting and stopping of the ultrasonic motor by bringing the oscillation drive circuit into an active state and a stop state, respectively;
wherein a rotational direction of the moving body is switched by switching the one of the power amplifiers placed in an active state based on the output signal from the start/stop signal generating means.

37. The ultrasonic motor according to claim 36; further comprising voltage detecting means for detecting a power source voltage of a power source; and voltage comparing means for comparing the voltage detected by the voltage detecting means with predetermined power source voltage data; and wherein the output adjusting signal adjusting means includes means for adjusting the output impedance of the power amplifier when the voltage detected by the voltage detecting means and the power source voltage data do not coincide with each other as a result of comparison by the voltage comparing means.

38. The ultrasonic motor according to claim 37; wherein the output impedance of the power amplifier is adjusted by cutting connection of drain sides of output stage transistors of the power amplifier constituting the oscillation drive circuit based on the output signal from the start/stop signal generating means or the output adjusting signal generating means.

* * * * *